US012754592B2

(12) United States Patent
Cao et al.

(10) Patent No.: US 12,754,592 B2
(45) Date of Patent: Oct. 6, 2026

(54) POSITIONING MECHANISM, FLEXIBLE PRINTED CIRCUIT, FLEXIBLE PRINTED CIRCUIT ASSEMBLY, AND ELECTRONIC DEVICE

(71) Applicant: HONOR DEVICE CO., LTD., Shenzhen (CN)

(72) Inventors: Han Cao, Shenzhen (CN); Yiwei Hou, Shenzhen (CN); Wenhao Wang, Shenzhen (CN); Xinrong Yang, Shenzhen (CN); Haifei Li, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 86 days.

(21) Appl. No.: 18/880,661

(22) PCT Filed: Aug. 15, 2023

(86) PCT No.: PCT/CN2023/113033
§ 371 (c)(1),
(2) Date: Jan. 2, 2025

(87) PCT Pub. No.: WO2024/103863
PCT Pub. Date: May 23, 2024

(65) Prior Publication Data

US 2026/0003406 A1 Jan. 1, 2026

(30) Foreign Application Priority Data

Nov. 14, 2022 (CN) ........................ 202211418193.3

(51) Int. Cl.
*G06F 1/16* (2006.01)
*G06F 1/183* (2026.01)

(52) U.S. Cl.
CPC .......... *G06F 1/1683* (2013.01); *G06F 1/1652* (2013.01); *G06F 1/183* (2013.01)

(58) Field of Classification Search
CPC ...... H05K 1/181; H05K 1/189; G06F 1/1681; G06F 1/1683
See application file for complete search history.

(56) References Cited

U.S. PATENT DOCUMENTS 6,096,986 A 8/2000 Flegel
11,853,130 B2 * 12/2023 Yu ........................... F16C 11/04
(Continued)

FOREIGN PATENT DOCUMENTS

CN 101336048 A * 12/2008
CN 102064404 A 5/2011
(Continued)

*Primary Examiner* — Adrian S Wilson

(57) ABSTRACT

This application provides a positioning mechanism, a flexible printed circuit, a flexible printed circuit assembly, and an electronic device. The solution includes a positioning mechanism configured to be arranged on a base. The positioning mechanism includes: at least two positioning members, arranged at intervals on the base along a length direction of the base; and a limiting member, arranged between the two positioning members, where each of the positioning members is provided with an clamping structure, two ends of the limiting member respectively extend to the clamping structures corresponding to the two positioning members, the clamping structure is configured to limit movement of the limiting member in a thickness direction of the base, and a flexible printed circuit is arranged between the limiting member and the base.

20 Claims, 19 Drawing Sheets

(56) References Cited

U.S. PATENT DOCUMENTS

| | | | | |
|---|---|---|---|---|
| 12,019,482 | B2 * | 6/2024 | Feng | G06F 1/1616 |
| 12,117,871 | B2 * | 10/2024 | Yuan | G06F 1/1616 |
| 12,271,236 | B2 * | 4/2025 | Feng | H04M 1/022 |
| 12,336,122 | B2 * | 6/2025 | Wang | H05K 1/148 |
| 12,411,525 | B2 * | 9/2025 | Wang | G06F 1/1656 |
| 12,452,352 | B2 * | 10/2025 | Ren | H04M 1/0216 |
| 12,453,056 | B2 * | 10/2025 | Huh | G06F 1/1652 |
| 12,520,422 | B2 * | 1/2026 | Bae | G09F 9/301 |
| 12,568,593 | B2 * | 3/2026 | Liu | H04M 1/0216 |
| 2011/0044013 | A1 | 2/2011 | Wei et al. | |
| 2022/0291720 | A1 | 9/2022 | Luo et al. | |
| 2022/0321683 | A1 * | 10/2022 | Luo | H04M 1/0268 |

FOREIGN PATENT DOCUMENTS

| | | | | |
|---|---|---|---|---|
| CN | 211580421 | U | * | 9/2020 |
| CN | 113314866 | A | | 8/2021 |
| CN | 216743503 | U | | 6/2022 |
| CN | 114863810 | A | | 8/2022 |
| CN | 115126768 | A | | 8/2024 |
| EP | 4057598 | A1 | | 12/2022 |

* cited by examiner

POSITIONING MECHANISM, FLEXIBLE PRINTED CIRCUIT, FLEXIBLE PRINTED CIRCUIT ASSEMBLY, AND ELECTRONIC DEVICE

CROSS-REFERENCE TO RELATED APPLICATIONS

This application is a National Stage of International Application No. PCT/CN2023/113033, filed on Aug. 15, 2023, which claims priority to Chinese Patent Application No. 202211418193.3, filed on Nov. 14, 2022, both of which are hereby incorporated by reference in their entireties.

TECHNICAL FIELD

This application relates to the field of electronic device technologies, and in particular, to a positioning mechanism, a flexible printed circuit, a flexible printed circuit assembly, and an electronic device.

BACKGROUND

Currently, when a flexible printed circuit (FPC) is applied to a foldable screen mobile phone, the FPC is usually fixed to a shaft cover of the foldable screen mobile phone by arranging a positioning mechanism. However, since a current positioning mechanism has a relatively large quantity of structures stacked in a Z direction, a relatively large space is occupied.

SUMMARY

In view of this, this application provides a positioning mechanism, a flexible printed circuit, a flexible printed circuit assembly, and an electronic device, to optimize a structure of the positioning mechanism.

To achieve the foregoing objective, this application provides the following technical solutions.

A first aspect of this application provides a positioning mechanism, which is configured to be arranged on a base. The positioning mechanism includes: at least two positioning members, arranged at intervals on the base along a length direction of the base: and a limiting member, arranged between the two positioning members, where each of the positioning members is provided with an clamping structure, two ends of the limiting member respectively extend to the clamping structures corresponding to the two positioning members, the clamping structure is configured to limit movement of the limiting member in a thickness direction of the base, and a flexible printed circuit is arranged between the limiting member and the base. Through comparison of the foregoing solution of examples of this application with the prior art, the flexible printed circuit is arranged between the limiting member and the base, and the movement of the limiting member in the thickness direction of the base is limited through the clamping structure. This simplifies mounting. Compared with the prior art, since a cover plate does not need to be arranged, fewer components are stacked in a Z direction, which reduces an occupied volume of the positioning mechanism and optimizes a structure of the positioning mechanism.

In some possible embodiments of this application, an inverted buckle includes an clamping groove. The clamping structure includes an clamping groove, and two ends of the limiting member respectively extend into the clamping grooves corresponding to the two positioning members. The clamping groove is provided to implement positioning of the limiting member. The clamping groove has a characteristic of a simple structure, which facilitates processing and molding.

In some possible embodiments of this application, the clamping groove adopts a run-through design along a width direction of the base. In a direction of the clamping groove, the clamping groove is designed to be in a run-through form, which is easy to process.

In some possible embodiments of this application, the positioning member includes a positioning post. An end of the positioning post is fixed to the base, and an other end of the positioning post is provided with a protrusion extending toward the limiting member.

The protrusion, the positioning post, and the base constitute the clamping groove.

In some possible embodiments of this application, the clamping groove is provided with opposite side walls along the width direction of the base. When the clamping groove is provided with side walls arranged oppositely, the side walls can abut against a protruding portion of the limiting member when the limiting member is subjected to an external force in the width direction of the base, thereby limiting movement in the width direction. Further, the side walls play a role of limiting, so that a space utilization rate may be increased, thereby increasing a positioning length in the width direction.

In some possible embodiments of this application, two end portions of the limiting member along the length direction of the base are each provided with a notch, and the positioning member corresponding to each notch is at least partially located in the notch.

In some possible embodiments of this application, the end portion of the limiting member extending to the positioning member includes two limiting portions arranged at intervals, and the notch is formed in a region between the two limiting portions. The notch is provided with a protruding portion protruding toward the clamping groove. The notch is provided to realize the limiting in the width direction and the length direction of the base, so that the structure is further optimized.

In some possible embodiments of this application, a positioning gap is defined between the notch and a part of the positioning members located in the notch. The positioning gap is provided, so that positioning precision can be ensured when the notch is assembled to the positioning post.

In some possible embodiments of this application, the positioning gap ranges from 0.03 mm to 0.1 mm.

In some possible embodiments of this application, an avoidance gap is defined between the protruding portion and the clamping groove in the width direction of the base. The avoidance gap is provided to alleviate a problem of limiting assembly of the notch due to mating of the protruding portion and the clamping groove.

In some possible embodiments of this application, the avoidance gap is larger than the positioning gap. By setting the avoidance gap to be larger than the positioning gap, no inclination occurs when the limiting member is mounted in place.

In some possible embodiments of this application, the notches at the two ends of the limiting member have different shapes, and a contour of the positioning member located in each of the notches matches a contour of the notch. The positioning post is arranged to have different section shapes, so that an error can be prevented. In other words, a risk of erroneously mounting the limiting member is reduced.

In some possible embodiments of this application, one of the two notches is a rectangular structure, and the other is a trapezoidal structure. The rectangular structure and the trapezoidal structure facilitate processing, optimize tool paths, and reduce processing time.

In some possible embodiments of this application, the positioning mechanism further includes a back adhesive arranged between the base and the flexible printed circuit. The flexible printed circuit can be further positioned in the thickness direction by arranging the back adhesive, and has specific insulation performance.

In some possible embodiments of this application, the positioning mechanism further includes a protective member arranged on two sides of the base in the width direction. The FPC may be prevented from being scratched by processing defects such as burrs and flashes on an edge of the base by arranging the protective member.

In some possible embodiments of this application, the protective member is a sheet structure.

In some possible embodiments of this application, the protective member includes Teflon mylar. When the protective member is Teflon mylar, the FPC may be prevented from being scratched by processing defects such as burrs and flashes on the edge of the base.

In some possible embodiments of this application, the limiting member includes a reinforcing member, and the reinforcing member is arranged on a circuit board body of the flexible printed circuit. It may be seen that in this embodiment, the limiting member includes the reinforcing member on the flexible printed circuit. Therefore, a function of limiting in a Z direction can be implemented through the reinforcing member of the flexible printed circuit, thereby reducing the volume occupied during the positioning of the flexible printed circuit and optimizing the structure.

In some possible embodiments of this application, the reinforcing member includes a steel reinforcing sheet.

A second aspect of this application provides a flexible printed circuit assembly, including the positioning mechanism described above, and further including a base and a flexible printed circuit. The flexible printed circuit is arranged on the base through the positioning mechanism.

A third aspect of this application provides a flexible printed circuit, including a circuit board body, and further including at least one reinforcing member as described in any one of the above embodiments. The reinforcing member is arranged on a surface of the circuit board body.

A fourth aspect of this application provides an electronic device. The electronic device includes a first housing, a second housing, and a rotating shaft connecting the first housing and the second housing. The electronic device further includes the flexible printed circuit assembly as described above. Two ends of the flexible printed circuit respectively extend into the first housing and the second housing.

In some possible embodiments of this application, the electronic device further includes a shaft cover. The shaft cover is arranged on an end surface opposite to a folded region of the rotating shaft.

In some possible embodiments of this application, at least two positioning members are arranged at intervals on an end surface of the shaft cover close to the rotating shaft along a length direction of the shaft cover.

In some possible embodiments of this application, the limiting member is located on a surface of the flexible printed circuit away from the shaft cover. When the limiting member is arranged on an upper surface of the flexible printed circuit and the FPC is subjected to an external force, a protruding portion abuts against a top wall of an inverted buckle, which may reduce a risk of cracking between the limiting member and the flexible printed circuit.

A fifth aspect of this application provides an electronic device, including a housing. The housing includes at least one flexible printed circuit assembly therein as described in any one of the above embodiments.

BRIEF DESCRIPTION OF DRAWINGS

To describe the technical solutions in embodiments of this application or in the prior art more clearly, the accompanying drawings required for describing the embodiments or the prior art are to be briefly described below. Apparently, the accompanying drawings in the following description merely show some embodiments of this application, and a person of ordinary skill in the art may still derive other accompanying drawings based on the provided accompanying drawings without creative efforts.

1. First housing, 2. Second housing, 3. Shaft cover, 4. FPC, 5. Positioning mechanism; 41. First FPC, 42. Second FPC, 43. First reinforcing member, 44. Second reinforcing member, 43*a*. First end, 43*b*. Second end, 43*a*1. First limiting portion, 43*a*2. First protruding portion, 43*a*3. Second limiting portion, 43*b*. First end, 43*b*. Second end, 43*b*1. Third limiting portion, 43*b*2. Second protruding portion, 43*b*3. Fourth limiting portion, 44*a*. First end, 44*b*. Second end, 51. First positioning post, 52. Second positioning post, 53. Third positioning post, 54. Fourth positioning post, 55. First back adhesive, 56. Second back adhesive, 57. First protective member, 58. Second protective member.

DESCRIPTION OF EMBODIMENTS

Terms "first", "second", "third", and the like in the specification, claims, and accompanying drawings of this application are used to distinguish between different objects rather than to limit a specific order.

In embodiments of this application, a term such as "in an example" or "for example" is used to represent giving an example, an illustration, or a description. Any embodiment or design solution described as "in an example" or "for example" in embodiments of this application should not be explained as being more preferred or having more advantages than another embodiment or design solution. Exactly, use of the term such as "in an example" or "for example" is intended to present a related concept in a specific manner.

Figure 1A:
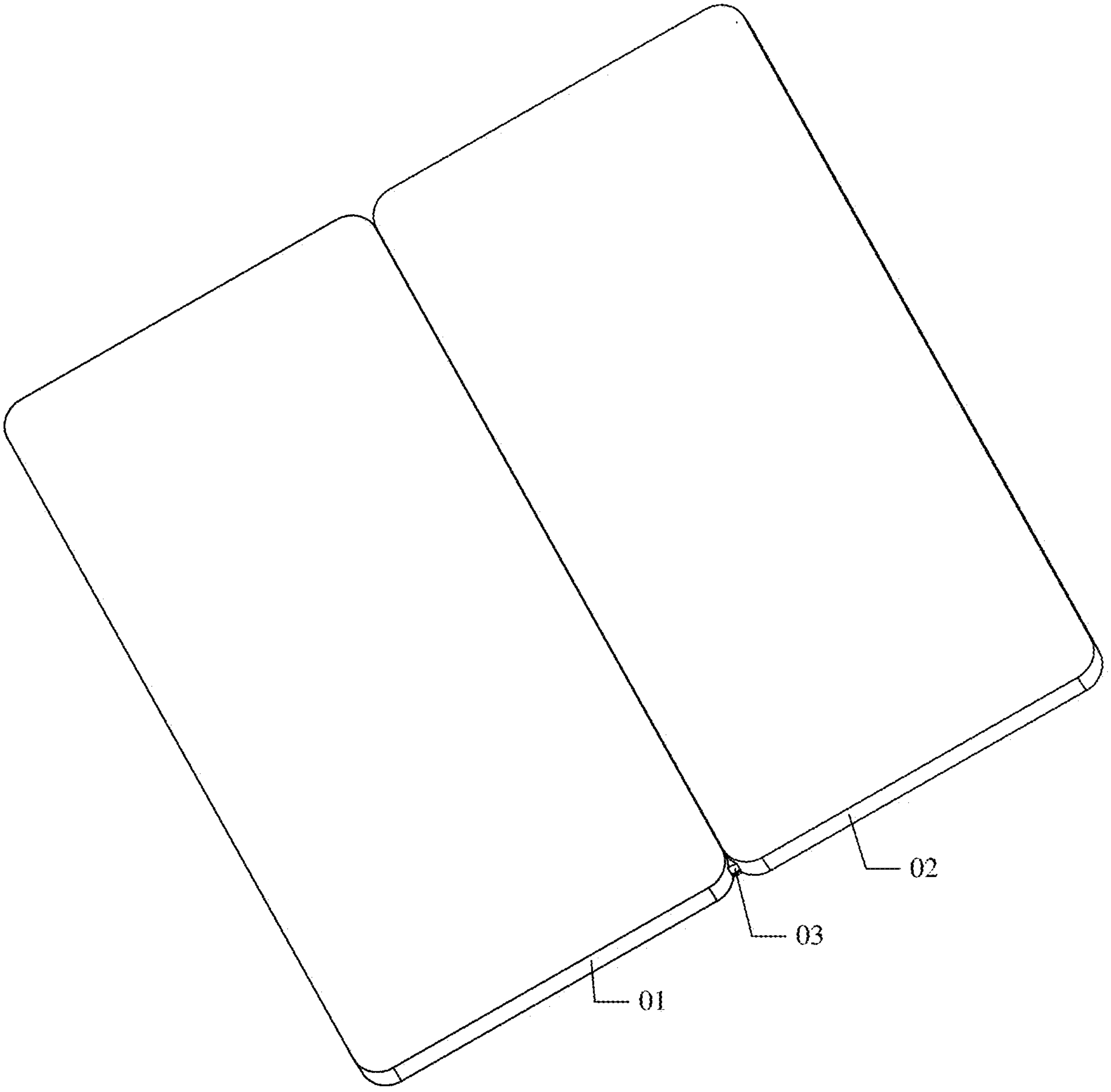
FIG. 1A is a schematic diagram of a foldable screen mobile phone in an unfolded state according to the prior art.
Figure 1B:
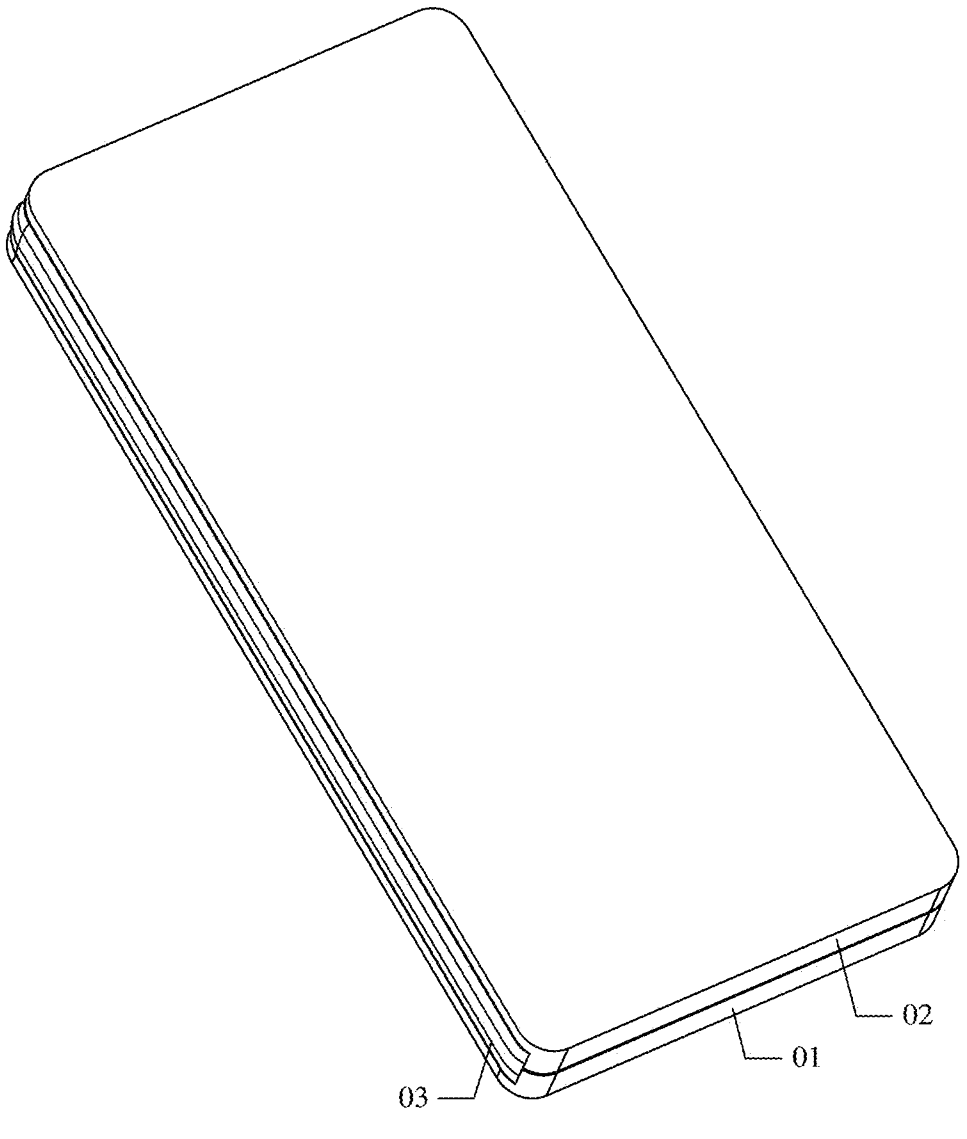
FIG. 1B is a schematic diagram of a foldable screen mobile phone in a folded state according to the prior art.

A mobile phone is used as an example. For example, FIG. 1A shows a foldable screen mobile phone in an unfolded state. FIG. 1B shows a foldable screen mobile phone in a folded state. The foldable screen mobile phone shown in the figures includes a first housing 01 and a second housing 02. The first housing 01 and the second housing 02 may be unfolded or folded around a rotating shaft assembly 03.

Figure 1C:
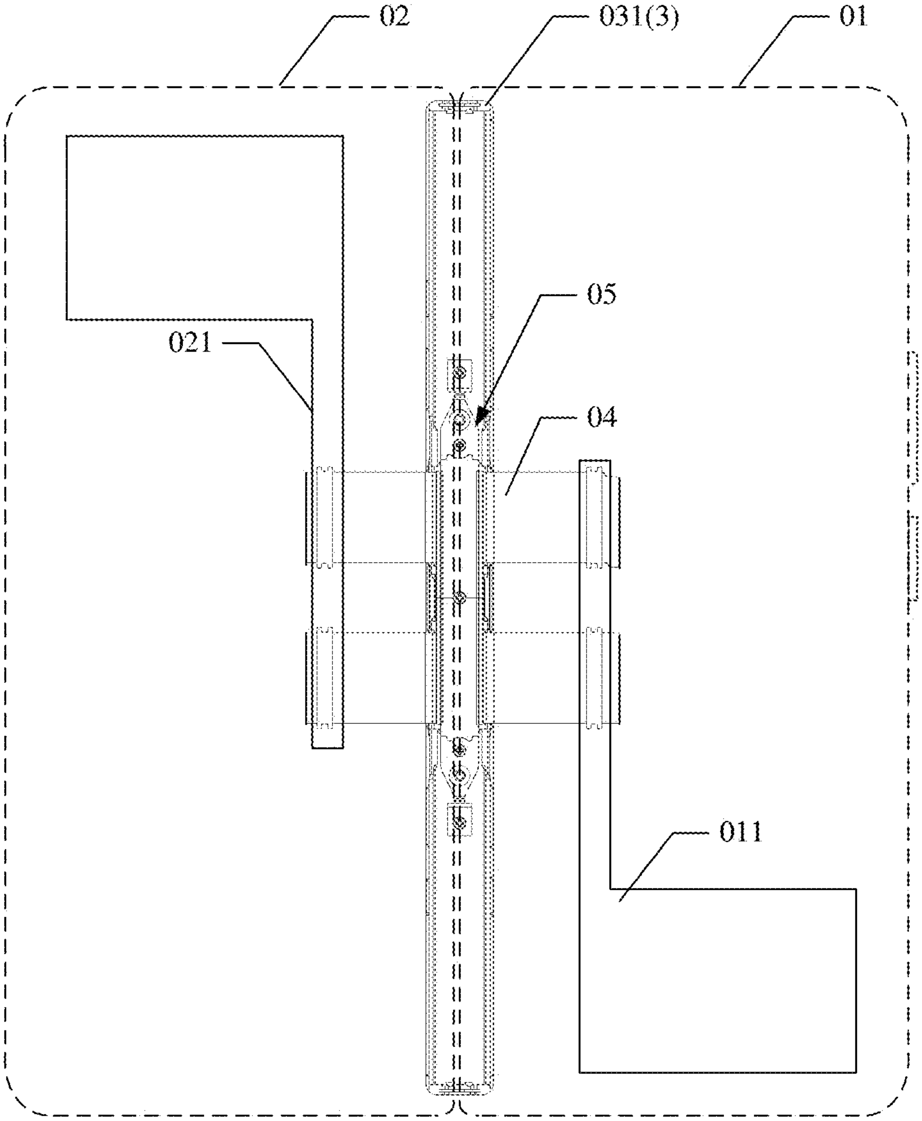
FIG. 1C is a diagram showing an application scenario of an FPC in a foldable screen mobile phone according to the prior art.

As shown in FIG. 1C, in the foldable screen mobile phone, a flexible printed circuit (flexible printed circuit, FPC) is usually used to connect a main circuit board 011 and an auxiliary circuit board 021 on two sides of the rotating shaft assembly 03, to implement transmission of signals and energy. During mounting of an FPC 04, a positioning mechanism is required to fix the FPC 04 to the rotating shaft assembly 03. A specific space is required for arrangement of a positioning mechanism 05, and the rotating shaft assembly 03 needs a space to implement a function thereof and ensure strength thereof. Therefore, it is particularly necessary to design the positioning mechanism of the FPC as small as possible.

It should be noted that the figure merely illustrates a general positional relationship among the first housing 01, the second housing 02, the rotating shaft assembly 03, the FPC 04, and the positioning mechanism 05 in the foldable screen mobile phone. The first housing 01 and the second housing 02 are respectively located on two sides of the rotating shaft assembly 03. An end of the FPC 04 is connected to the main circuit board 011 located inside the first housing 01, and an other end of the FPC is connected to the auxiliary circuit board 021 located inside the second housing 02. A middle portion of the FPC 04 is fixed to a shaft cover 031 of the rotating shaft assembly 03 through the positioning mechanism 05.

Figure 2:
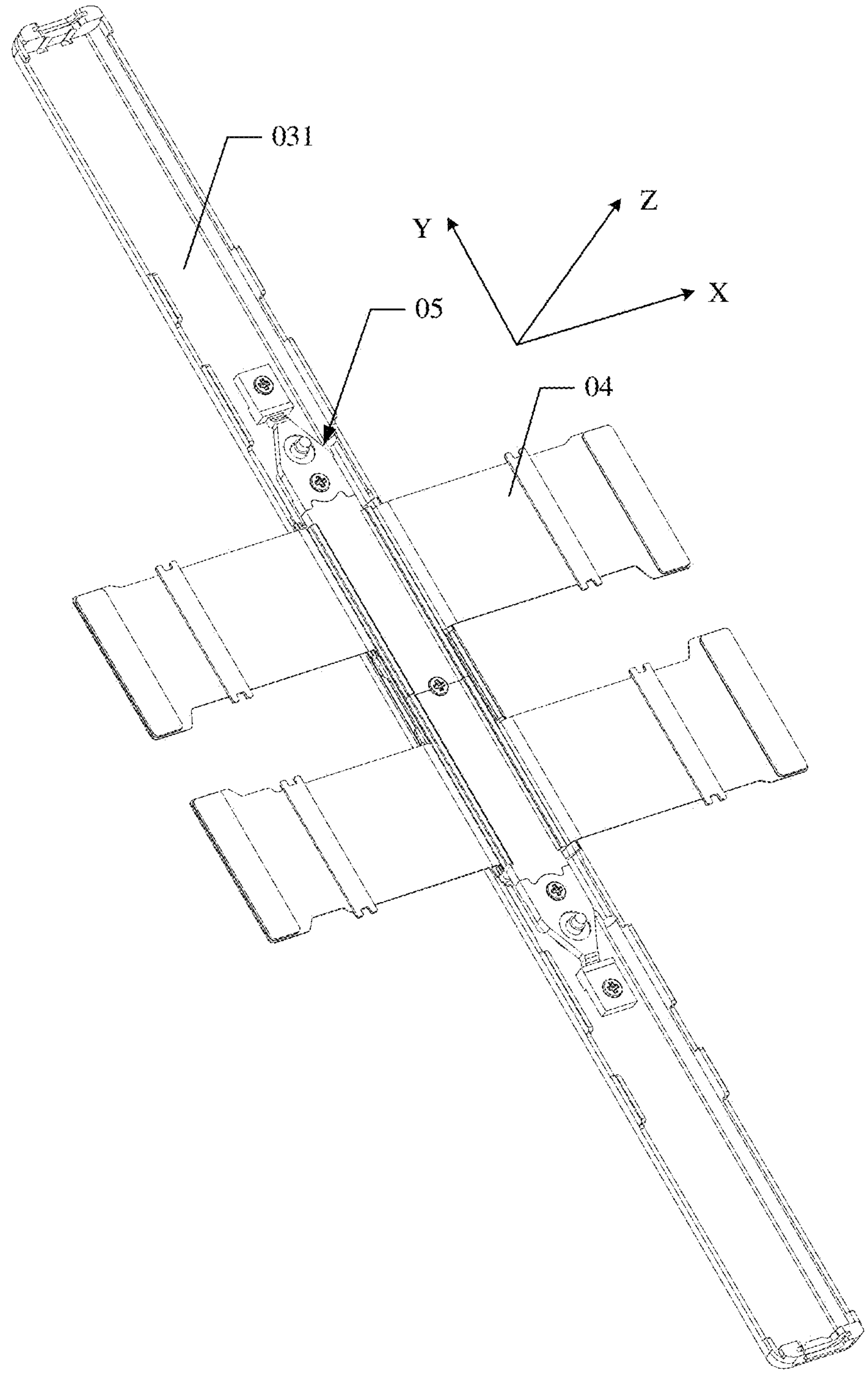
FIG. 2 is a three-dimensional assembly view of an FPC, a positioning mechanism, and a shaft cover according to the prior art.
Figure 3:
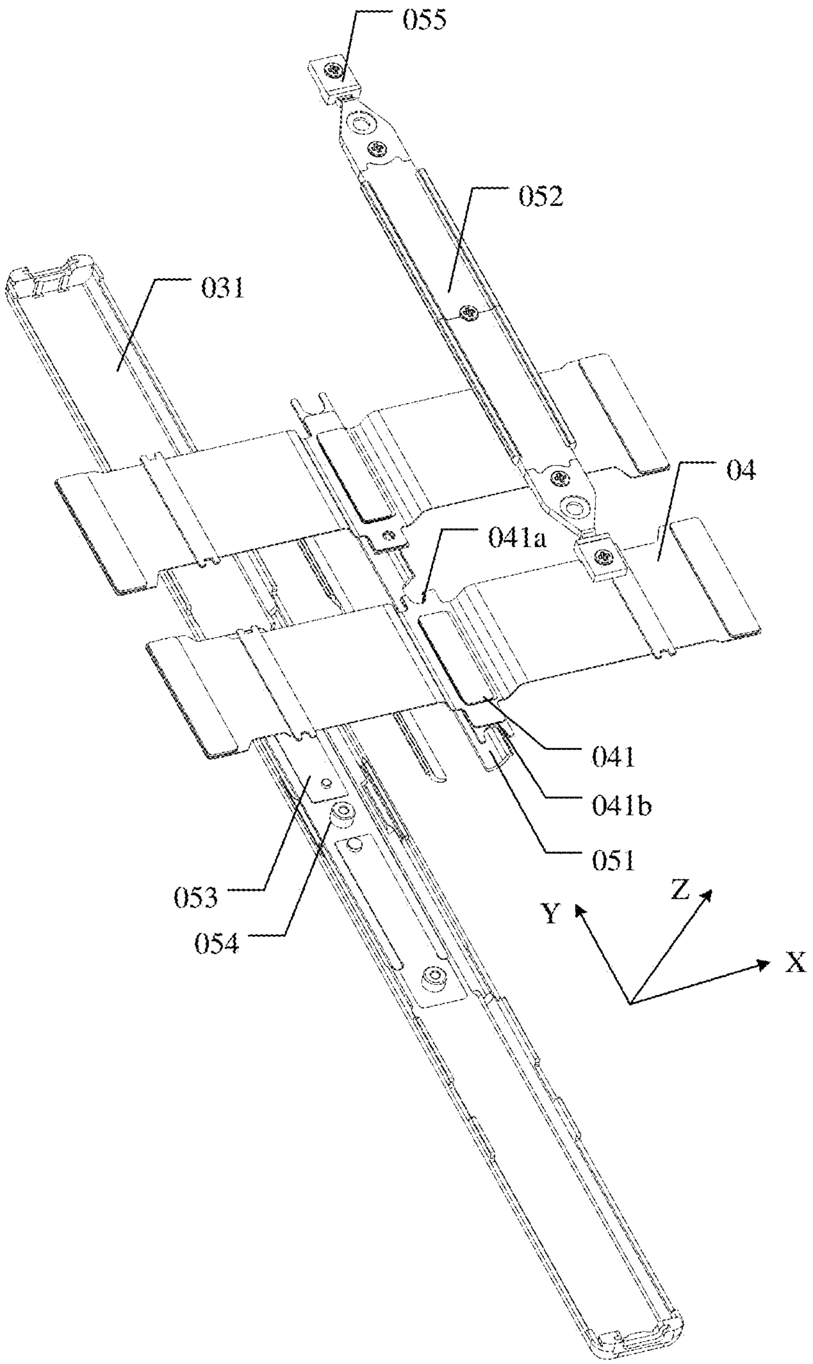
FIG. 3 is an exploded view of an FPC, a positioning mechanism, and a shaft cover according to the prior art.

As shown in FIG. 2 and FIG. 3, FIG. 2 is a three-dimensional view of the FPC 04 fixed to the shaft cover 031 through the positioning mechanism 05 in the prior art, and FIG. 3 is an exploded view of the FPC 04, the positioning mechanism 05, and the shaft cover 031 in the prior art. The positioning mechanism 05 in the figure includes a support 051, a cover plate 052, a back adhesive 053, and a pressing block 055. The support 051 is arranged below the FPC 04 and adhered to the shaft cover 03 through the back adhesive 053. The cover plate 052 is arranged above the FPC 04, and is locked on the shaft cover 031 by screws. To improve connection strength between the cover plate 052 and the shaft cover 031, a pressing block 055 is arranged on each of two ends of the cover plate 052, and the cover plate is further fixed to the shaft cover 031 through the pressing blocks 055. With the dual cooperation of the back adhesive 053 and the cover plate 052, fixation and positioning of the FPC 04 in a Z direction are implemented. A notch 041*a* at a first end and a notch 041*b* at a second end of a reinforcing member 041 of the FPC 04 are mated with a positioning post 054 on the shaft cover 031, to implement fixation and positioning of the FPC 04 in an X direction and a Y direction. The X direction, the Y direction, and the Z direction are perpendicular to each other. However, during mounting of the positioning mechanism 05 of the foregoing structure, screws need to be arranged for both the cover plate 052 and the pressing block 055 to realize the connection between the cover plate 052 and the shaft cover 031. For the connection between the pressing block 055 and the shaft cover 031, a relatively large quantity of mounting processes are required, and an additional structure for mating with the screws needs to be arranged. In addition, structures stacked in the Z direction include the back adhesive 053, the FPC, and the cover plate 052, or the support 051, the FPC, and the cover plate 052. In other words, a relatively large quantity of structures stacked in the Z direction occupy space in the Z direction. This is inconsistent with a requirement for a miniaturized design of the positioning mechanism 05.

Based on this, this application provides an electronic device, an FPC assembly, an FPC, and a positioning mechanism, to optimize the structure.

Figure 4:
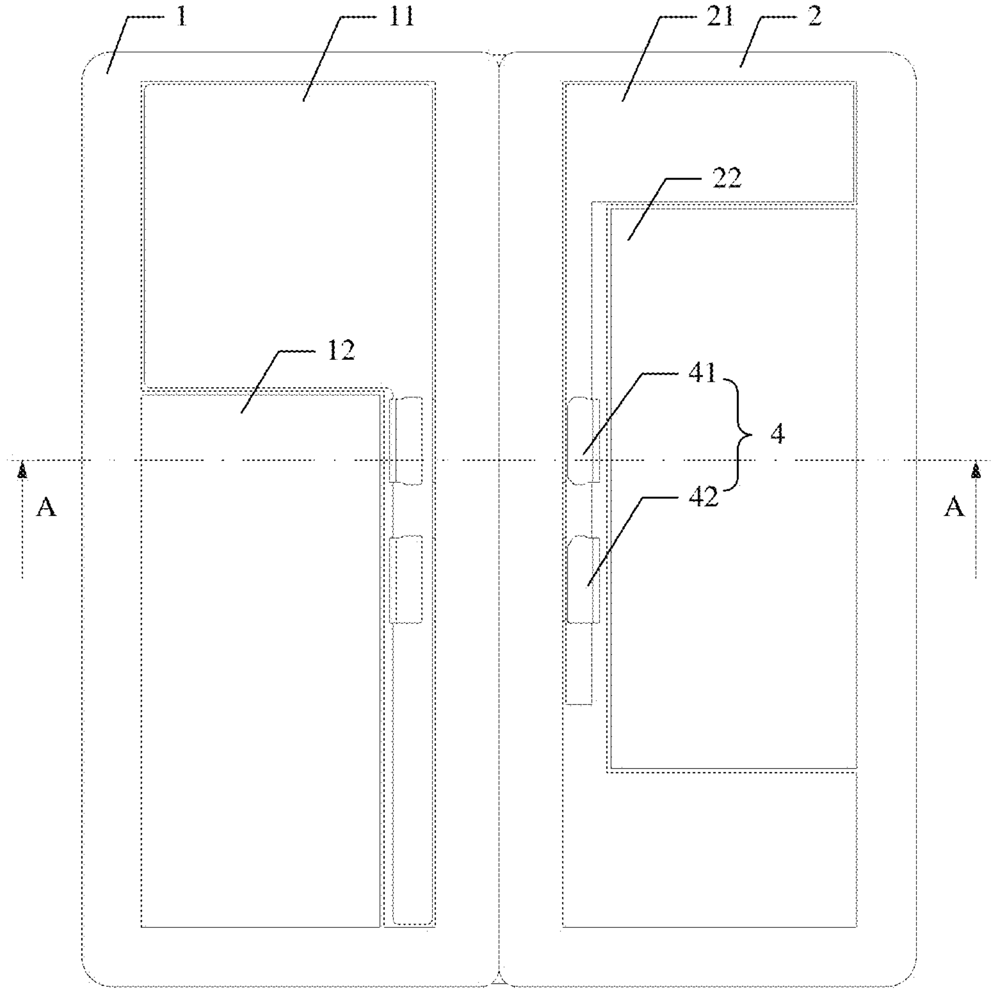
FIG. 4 is a diagram showing an application scenario of an FPC in a foldable screen mobile phone according to an embodiment of this application.
Figure 5:
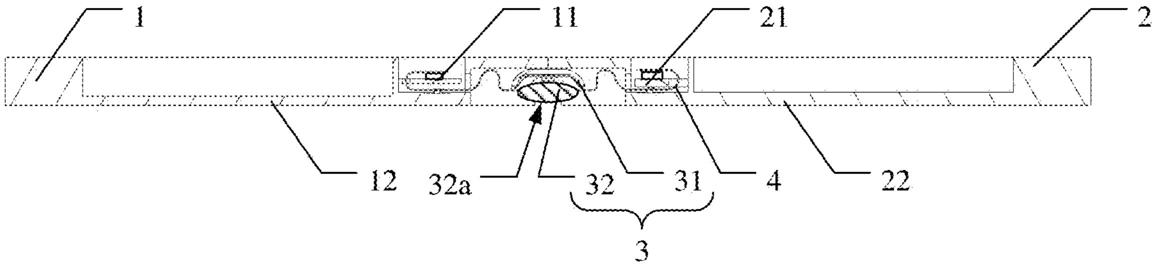
FIG. 5 is a schematic diagram of a section in FIG. 4 taken along A-A.

As shown in FIG. 4 and FIG. 5, FIG. 4 is a diagram showing an application scenario of an FPC in a foldable screen mobile phone. The figure merely illustrates a general positional relationship among a first housing 1, a second housing 2, a rotating shaft assembly 3, an FPC 4, and a positioning mechanism 5 in the foldable screen mobile phone. The first housing 1 and the second housing 2 are respectively located on two sides of the rotating shaft assembly 3. An end of the FPC 4 bypasses and is electrically connected to a main circuit board 11 located inside the first housing 1, and an other end of the FPC 4 bypasses and is electrically connected to an auxiliary circuit board 21 located inside the second housing 2. A middle portion of the FPC 4 is fixed to the rotating shaft assembly 3 through the positioning mechanism 5.

A part of the FPC 4 located in the first housing 1 is fixed to a middle frame 12 of the first housing 1, and a part of the FPC 4 located in the second housing 2 is fixed to a middle frame 22 of the second housing 2. The middle frame 12 is configured to form a mounting plate or a mounting groove in the first housing 1, and the middle frame 22 is configured to form a mounting plate or a mounting groove in the second housing 1.

The rotating shaft assembly 3 includes a rotating shaft 32. The rotating shaft 32 is a core component for realizing unfolding or folding of the first housing 1 and the second housing 2. An end surface of the rotating shaft 32 has a folded region 32*a*, and the rotating shaft 32 may be folded or unfolded around the folded region 32*a*. The rotating shaft assembly 3 further includes a shaft cover 31. The shaft cover 31 is arranged on an end surface of the rotating shaft 32 opposite to the folded region 32*a*. In an example of this application, the positioning mechanism 5 may be arranged on the rotating shaft 32 of the rotating shaft assembly 3, may be further arranged on the shaft cover 31 of the rotating shaft assembly 3, may be further arranged on the middle frame 12, and may be further arranged on the middle frame 22. In this application, the shaft cover 31, the rotating shaft 32, and/or the middle frame 12, 22 configured to arrange the positioning mechanism 5 may be understood as the base, and the FPC can be fixed to a specific part by arranging the positioning mechanism 5. This application focuses on description of a structure of the positioning mechanism 5 arranged on the shaft cover 31.

It should be noted that the figure illustrates a case in which two FPCs 4 are arranged, including a first FPC 41 and a second FPC 42. Certainly, one FPC 4 may be further arranged.

The foldable screen mobile phone of this application is used as an electronic device. The foregoing electronic device may further be a mobile terminal device having a battery, for example, a non-foldable screen mobile phone other than the foldable screen mobile phone, a tablet computer (portable android device, PAD), a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), a wearable electronic device, or a smart watch. A form of the electronic device is not specifically limited in embodiments of this application.

Figure 6:
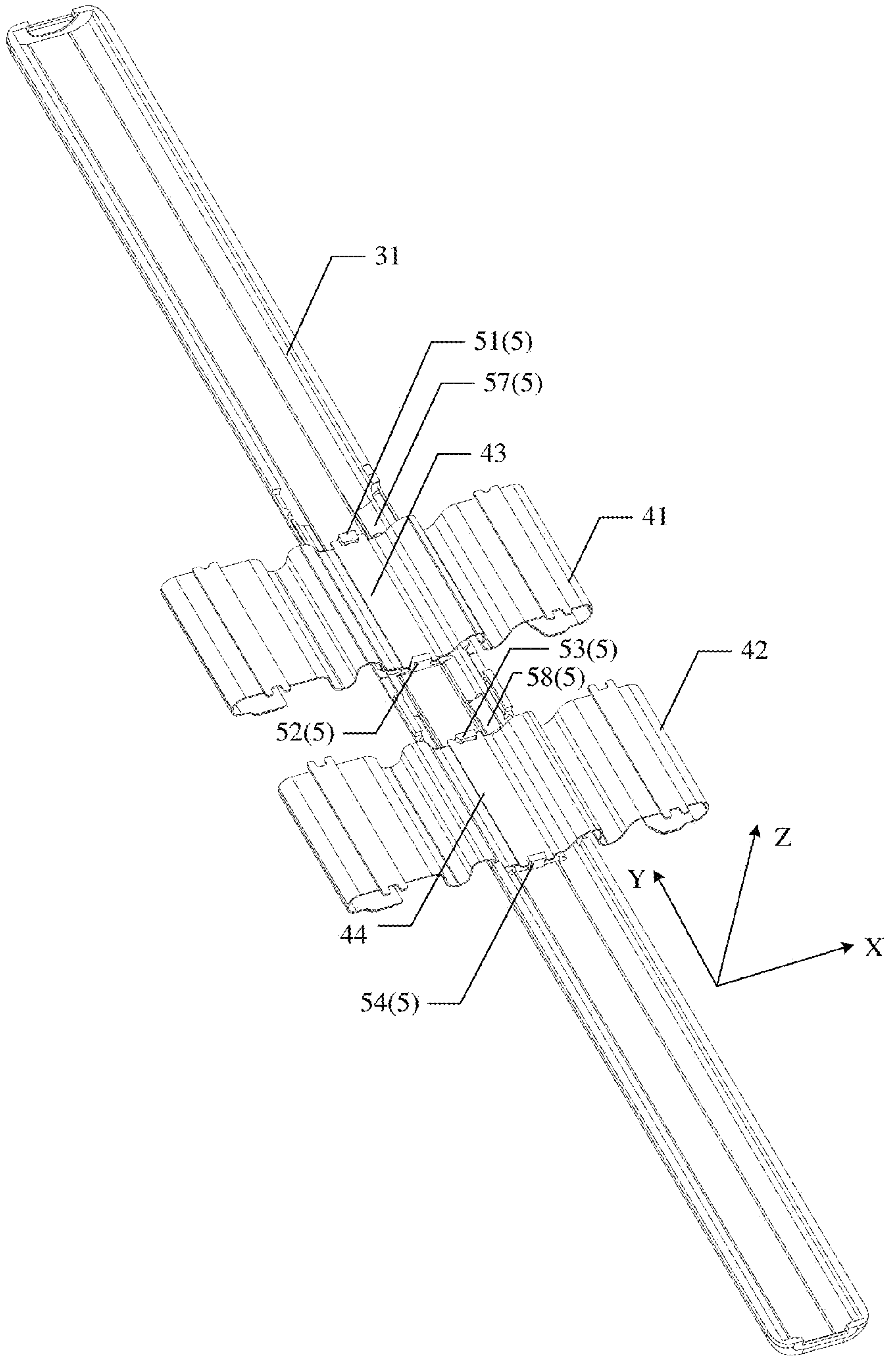
FIG. 6 is a three-dimensional view of an FPC fixed to a shaft cover through a positioning mechanism according to an embodiment of this application.
Figure 7:
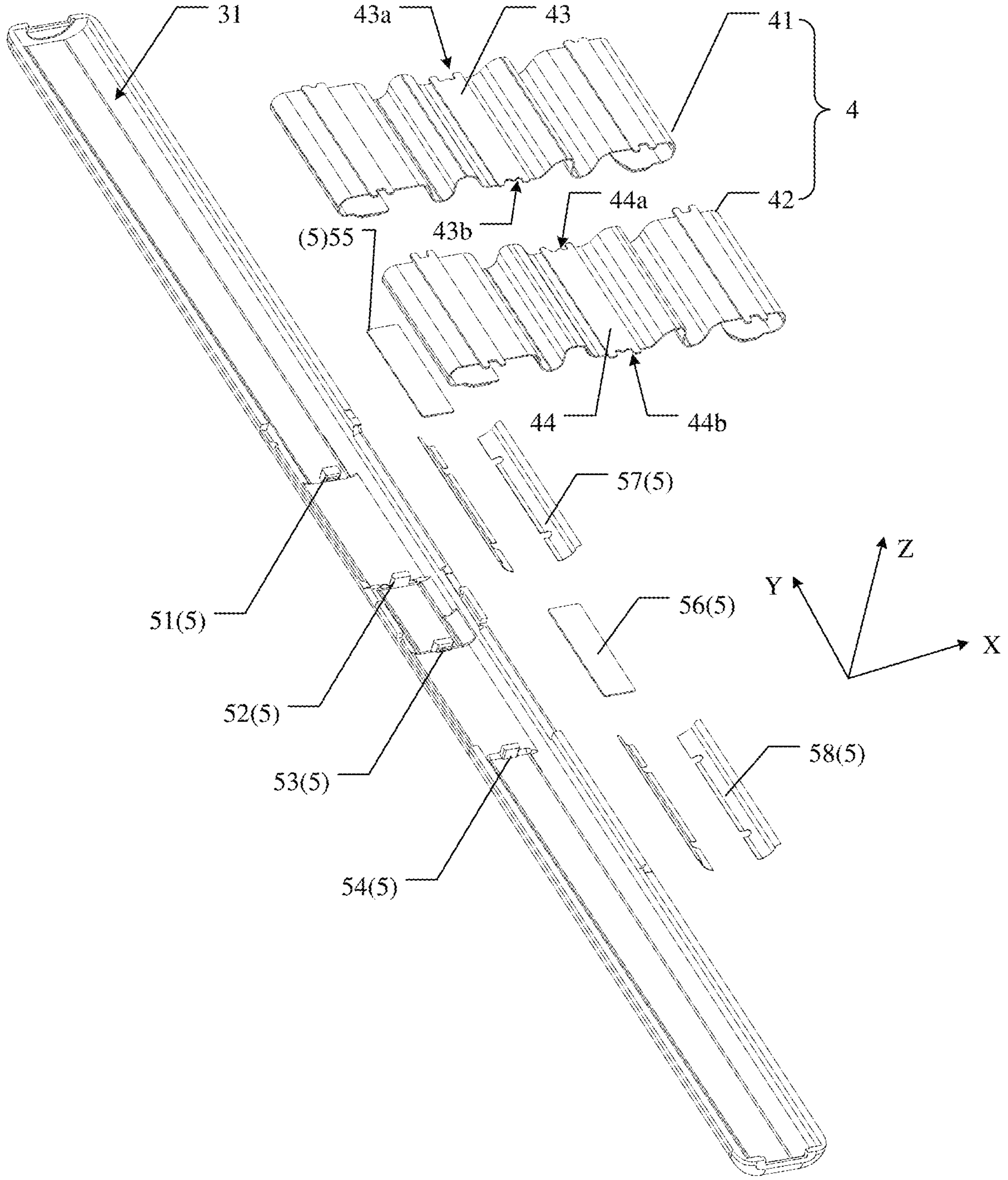
FIG. 7 is an exploded view of an FPC, a positioning mechanism, and a shaft cover according to an embodiment of this application.

Refer to FIG. 6. FIG. 6 is a three-dimensional view of an FPC fixed to a shaft cover through a positioning mechanism according to an embodiment of this application, and FIG. 7 is an exploded view of an FPC, a positioning mechanism, and a shaft cover according to an embodiment of this application. Two FPCs 4 shown in the figure are arranged, including a first FPC 41 and a second FPC 42. The first FPC 41 is provided with a first reinforcing member 43, and the second FPC 42 is provided with a second reinforcing member 44. The first reinforcing member 43 exists as a self-contained structure of the first FPC 41, to improve mechanical strength of a local mounting part of the first FPC 41. The second reinforcing member 44 exists as a self-contained structure of the second FPC 42, to improve mechanical strength of a local mounting part of the second FPC 42.

To reduce a risk of cracking between the FPC and the reinforcing member, in some examples of this application, the first reinforcing member 43 is arranged on a surface of the first FPC 41 away from the shaft cover 31. When the first FPC 41 is subjected to an external force, the first reinforcing member 43 is first stressed, thereby reducing the risk of cracking between the first FPC 41 and the first reinforcing member 43. Similarly, the second reinforcing member 44 is arranged on a surface of the second FPC 42 away from the shaft cover 31.

The positioning mechanism 5 shown in the figure includes a first positioning post 51, a second positioning post 52, a third positioning post 53, a fourth positioning post 54, a first back adhesive 55, a second back adhesive 56, a first protective member 57, a second protective member 58, a first reinforcing member 43, and a second reinforcing member 44. The first positioning post 51, the second positioning post 52, the first back adhesive 55, and the first protective member 57 are configured to fix the first FPC 41. The third positioning post 53, the fourth positioning post 54, the second back adhesive 56, and the second protective member 58 are configured to fix the second FPC 42.

Specifically, the first protective member 57 and the first back adhesive 55 are arranged below the first FPC 41, and are adhered to the shaft cover 31 through the first back adhesive 55. A first end 43*a* of the first reinforcing member 43 is mated with the first positioning post 51, and a second end 43*b* of the first reinforcing member 43 is mated with the second positioning post 52. In addition, the first reinforcing member 43 is clamped between the first positioning post 51 and the second positioning post 52 when being mounted in place between the first positioning post 51 and the second positioning post 52, to limit movement of the first reinforcing member 43 in an X direction, a Y direction, and a Z direction.

The second protective member 58 and the second back adhesive 56 are arranged below the second FPC 42, and are adhered to the shaft cover 31 through the second back adhesive 56. A first end 44*a* of the second reinforcing member 44 is mated with the third positioning post 53, and a second end 44*b* of the second reinforcing member 44 is mated with the fourth positioning post 54. In addition, the second reinforcing member 44 is clamped between the third positioning post 53 and the fourth positioning post 54 when being mounted in place between the third positioning post 53 and the fourth positioning post 54, to limit movement of the second reinforcing member 44 in the X direction, the Y direction, and the Z direction.

It should be noted that the X direction, the Y direction, and the Z direction are perpendicular to each other. In the figure, the X direction corresponds to a width direction of the shaft cover 31, the Y direction corresponds to a length direction of the shaft cover 31, and the Z direction corresponds to a thickness direction of the shaft cover 31.

It may be learned that the structures stacked in the Z direction in the foregoing embodiments of the examples of this application include the back adhesive and the FPC 4, or the protective member and the FPC 4. Compared with the prior art, the FPC 4 may be directly clamped between the positioning posts through the reinforcing member (the first FPC 41 may be directly clamped between the first positioning post 51 and the second positioning post 52 through the first reinforcing member 43, and the second FPC 42 may be directly clamped between the third positioning post 53 and the fourth positioning post 54 through the second reinforcing member 44). The mounting is simple and convenient. In addition, since the reinforcing member is the structure of the FPC (the first reinforcing member 43 is the structure of the first FPC 41, and the second reinforcing member 44 is the structure of the second FPC 42), no additional cover plate is required. Fewer components are stacked in the Z direction, which reduces an occupied volume and a weight of the positioning mechanism 5 and optimizes the structure of the positioning mechanism 5.

In the foregoing example of this application, the first protective member 57 is configured to protect the first FPC 41 and prevent processing defects such as burrs and flashes of the shaft cover 31 from scratching the first FPC 41. The second protective member 58 is configured to protect the second FPC 42 and prevent the processing defects such as burrs and flashes of the shaft cover 31 from scratching the second FPC 42.

In the example of this application, two first protective members 57 may be arranged. The two first protective members 57 are each laid on a part of the shaft cover 31 close to a side edge in the X direction, and are respectively located on two sides of the first back adhesive 55. In some other examples of this application, one first protective member 57 may be arranged. The one first protective member 57 surrounds a periphery of the first back adhesive 55, and extends to the part of the shaft cover 31 close to the side edge. Certainly, in another example of this application, another quantity of first protective members 57 may be further arranged, as long as protective performance of key parts of the first FPC 41 and the shaft cover 31 can be implemented.

Similarly, two second protective members 58 may be arranged. The two second protective members 58 are each laid on the part of the shaft cover 31 close to the side edge in the X direction, and are respectively located on two sides of the second back adhesive 56. In some other examples of this application, one second protective member 58 may be arranged. The one second protective member 58 surrounds a periphery of the second back adhesive 56, and extends to the part of the shaft cover 31 close to the side edge. Certainly, in another example of this application, another quantity of second protective members 58 may be further arranged, as long as protective performance of key parts of the second FPC 42 and the shaft cover 31 can be implemented.

In some examples of this application, the first protective member 57 and the second protective member 58 described above are independent components, and are arranged at corresponding parts of the shaft cover 31 in the foregoing manner. In some examples of this application, the first protective member 57 and the second protective member 58 are formed as an integral structure, which surround the periphery of the first back adhesive 55 and the periphery of the second back adhesive 56, and extend to the parts of the shaft cover 31 close to the side edge.

The first protective member 57 and the second protective member 58 include a sheet structure made of an insulating material. The foregoing insulating material may be, for example, non-metallic mylar. Common materials of the non-metallic mylar include polycarbonate (PC), polyterephthalate plastic (PET, Polyethyleneterephthalate), Teflon (PTFE, Polytetrafluoroethene), and the like. Preferably, Teflon mylar is selected. Teflon, also referred to as polytetrafluoroethylene, is a synthetic polymer material that uses fluorine to replace all hydrogen atoms in polyethylene. Teflon has characteristics of acid resistance, alkali resistance, resistance to various organic solvents, and is almost insoluble in all solvents. In addition, polytetrafluoroethylene has a characteristic of resistance to high temperatures, and has an excessively small friction coefficient, which may be therefore used as a lubricant and also becomes an ideal coating for non-stick pans and water pipe lining. The first protective member 57 and the second protective member 58 include Teflon mylar, which may reduce friction noise generated during the movement of the first FPC 41 and/or the second FPC 42 relative to the shaft cover 31.

In some other examples of this application, the first protective member 57 and the second protective member 58 include a coating structure applied to an end surface of the shaft cover 31. Preferably, the coating structure is a Teflon coating.

In an example of this application, the first back adhesive 55 and the second back adhesive 56 may be an adhesive, a double-sided adhesive, a foam adhesive, and the like. The first FPC 41 and the second FPC 42 are positioned in the Z direction. The first back adhesive 55 and the second back adhesive 56 may be further adjusted to be insulating or conductive as required, to ensure insulating performance or electrical conductivity between the first FPC 41 and the shaft cover 31 at a position where the first back adhesive 55 is arranged, and insulating performance or electrical conductivity between the second FPC 42 and the shaft cover 31 at a position where the second back adhesive 56 is arranged.

In the foregoing example of this application, the positioning mechanism 5 includes a solution of the first protective member 57, the second protective member 58, the first back adhesive 55, and the second back adhesive 56. In some other examples of this application, the positioning mechanism 5 includes a solution of the first protective member 57 and the second protective member 58, that is, does not include a solution of the first back adhesive 55 and the second back adhesive 56. The first protective member 57 is laid at a position of the shaft cover 31 corresponding to the first FPC 41, and the second protective member 58 is laid at a position of the shaft cover 31 corresponding to the second FPC 42.

A structure for positioning the first FPC 41 in the positioning mechanism 5 is similar to a structure for positioning the second FPC 42. The following examples of this application focus on description of the structure for positioning the first FPC 41.

Figure 8:
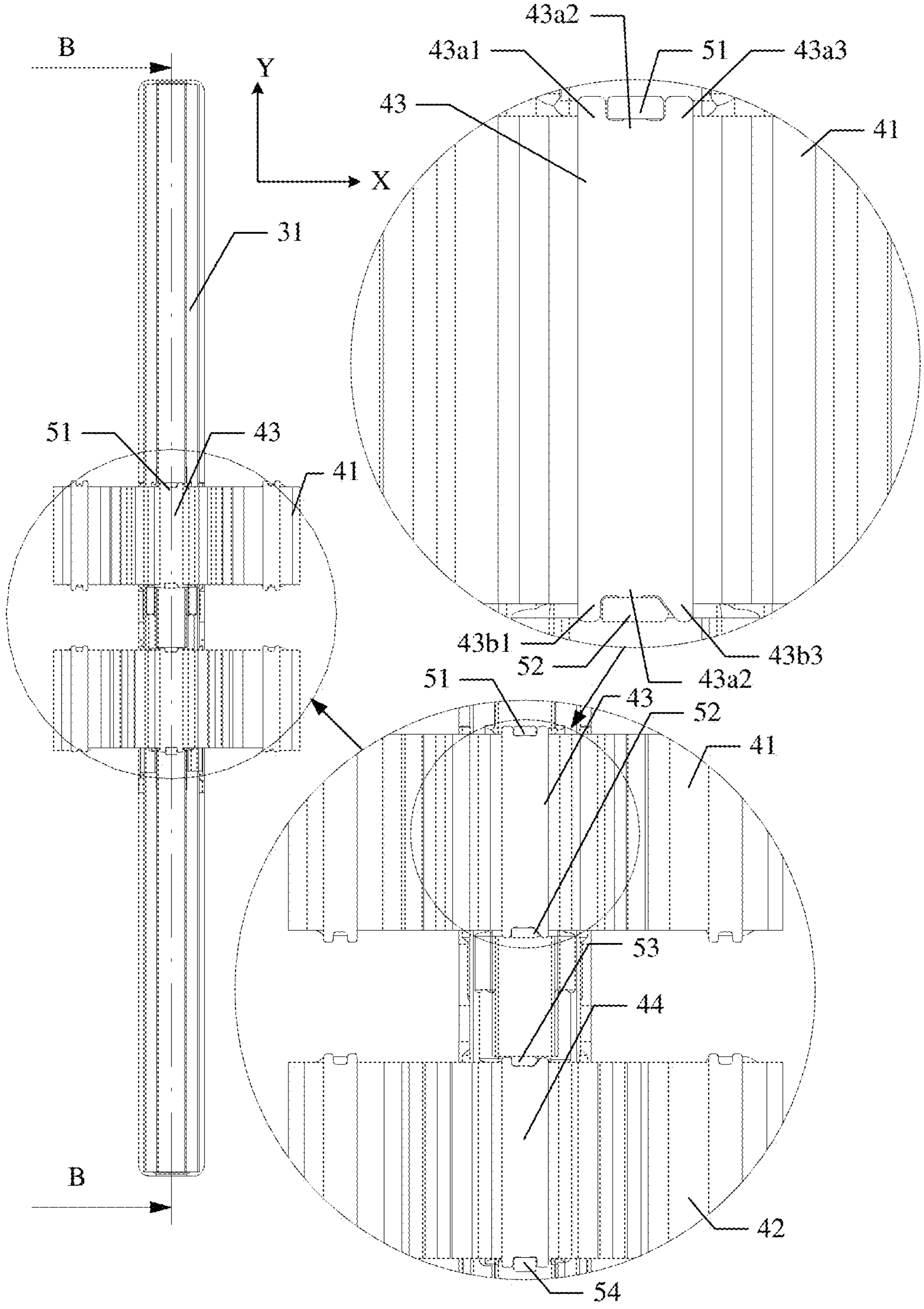
FIG. 8 is a front view of an FPC fixed to a shaft cover through a positioning mechanism according to an embodiment of this application.

Refer to FIG. 8. A first positioning post 51 and a second positioning post 52 are arranged at intervals along a Y direction, and a first reinforcing member 43 is mounted between the first positioning post and the second positioning post. A first limiting portion **43*a*1 and a second limiting portion 43*a*3 are arranged at intervals on a first end 43*a* of the first reinforcing member 43. A region between the first limiting portion 43*a*1 and the second limiting portion 43*a*3 forms a first notch for accommodating at least part of the first positioning post 51. A first protruding portion 43*a*2 protrudes from a notch wall of the first notch toward the first positioning post 51. The first protruding portion 43*a*2 is snap-fitted to a surface of the first positioning post 51 opposite to the second positioning post 52. A third limiting portion 43*b*1 and a fourth limiting portion 43*b*3 are arranged at intervals on a second end 43*b* of the first reinforcing member 43. The third limiting portion 43*b*1 and the fourth limiting portion 43*b*3 form a second notch for accommodating at least part of the second positioning post 52. A second protruding portion 43*b*2 protrudes from a notch wall of the second notch toward the first positioning post 51. The second protruding portion 43*b*2 is snap-fitted to a surface of the second positioning post 52 opposite to the first positioning post 51. It may be seen that the first reinforcing member 43 is between the first positioning post 51 and the second positioning post 52, so as to limit movement of the first reinforcing member 43 in the Y direction. At least part of the first positioning post 51 is located in the first notch, and at least part of the second positioning post 52 is located in the second notch, thereby limiting movement of the first end 43*a* and the second end 43*b* of the first reinforcing member 43 in the X direction. The first reinforcing member 43 has specific elastic resilience. After the first protruding portion 43*a*2 is snap-fitted to the first positioning post 51, and the second protruding portion 43*b*2 is snap-fitted to the second positioning post 52, the movement of the first reinforcing member 43 in the Z direction is limited by a snap fit of the two ends of the first reinforcing member 43. It may be seen that the structure is optimized through the example of this application. In addition, relatively few adaptive adjustments are made to a tool path and a mold structure for processing the shaft cover 31**, thereby shortening a development cycle.

A contour of the first positioning post 51 located in the first notch matches a contour of the first notch. A projection (a section) of the first positioning post 51 on a plane where XY is located is generally shaped like a rectangle, and a projection (a section) of the second positioning post 52 on a plane where XY is located is generally shaped like a trapezoid. However, the first notch mated with the first positioning post 51 is generally shaped like a rectangle, and the second notch mated with the second positioning post 52 is generally shaped like a trapezoid. The first end of the first reinforcing member 43 can only be assembled to the first positioning post 51, and the second end of the first reinforcing member 43 can only be assembled to the second positioning post 52. In this way, the first reinforcing member 43 can be mounted in place. Such arrangement can implement a purpose of error prevention (preventing a mounting error). In the example of this application, an effect of error prevention can be achieved by arranging different sectional shapes and notch shapes. In still some examples of this application, a sectional shape of the first positioning post 51 may be further the same as a sectional shape of the second positioning post 52. Similarly, a shape of the first notch may be further the same as a shape of the second notch.

A contour of the second positioning post 52 located in the second notch matches a contour of the second notch. The sectional shape of the first positioning post 51 in the figure is generally shaped like a rectangle. Certainly, the sectional shape may be alternatively a relatively regular shape such as a circle, an ellipse, or a trapezoid, or may be an irregular shape. In this application, the rectangular structure is preferably adopted, which has low processing difficulty and is conducive to processing and formation.

The sectional shape of the second positioning post 52 in the figure is generally shaped like a trapezoid, for example, an isosceles trapezoid or a right-angled trapezoid in the trapezoid, may be alternatively a relatively regular shape such as a circle, an ellipse, or a rectangle, or may be an irregular shape. In this application, a right-angled trapezoidal structure is preferably adopted, which is easy for processing and formation based on the rectangular structure, and has little improvement of the tool path.

Figure 9:
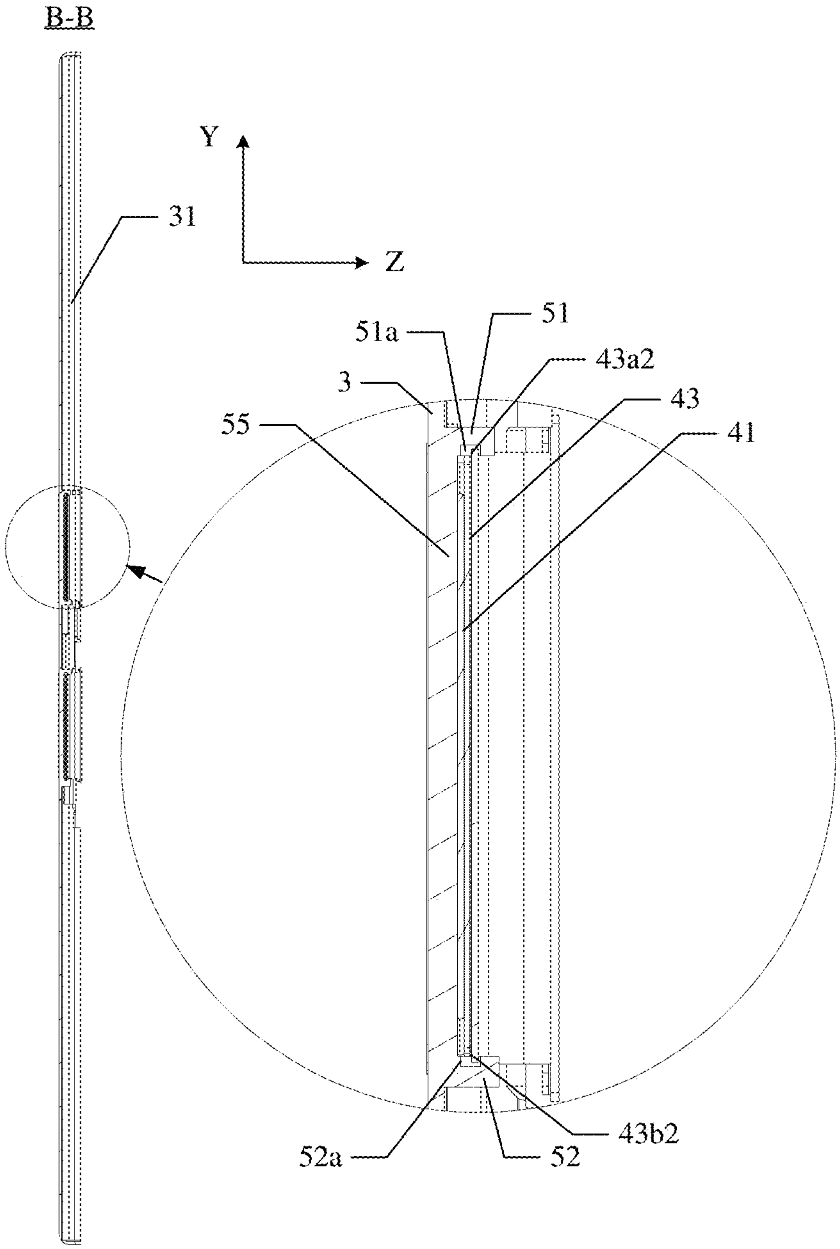
FIG. 9 is a schematic diagram of a section in FIG. 8 taken along B-B.

Refer to FIG. 9. A first clamping groove 51*a* is provided on a surface of a first positioning post 51 opposite to a second positioning post 52, to mate with a first protruding portion 43*a*2 of a first reinforcing member 43. The first clamping groove 51*a* is provided with a top wall and a bottom wall arranged opposite to the top wall in a Z direction, and the top wall of the first clamping groove 51*a* can abut against the first protruding portion 43*a*2. When an external force in the Z direction is applied to the first reinforcing member 43, the top wall of the first clamping groove 51*a* abuts against the first protruding portion 43*a*2 to prevent the first protruding portion 43*a*2 from being disengaged from the first clamping groove 51*a* in the Z direction. A second clamping groove 52*a* is provided on a surface of the second positioning post 52 opposite to the first positioning post 51, to mate with a second protruding portion 43*b*2 of the first reinforcing member 43. A top wall of the second clamping groove 52*a* can abut against the second protruding portion 43*b*2 in the Z direction. When an external force in the Z direction is applied to the first reinforcing member 43, the top wall of the first clamping groove 51*a* abuts against the second protruding portion 43*b*2 to prevent the second protruding portion 43*b*2 from being disengaged from the second clamping groove 52*a* in the Z direction.

Figure 10:
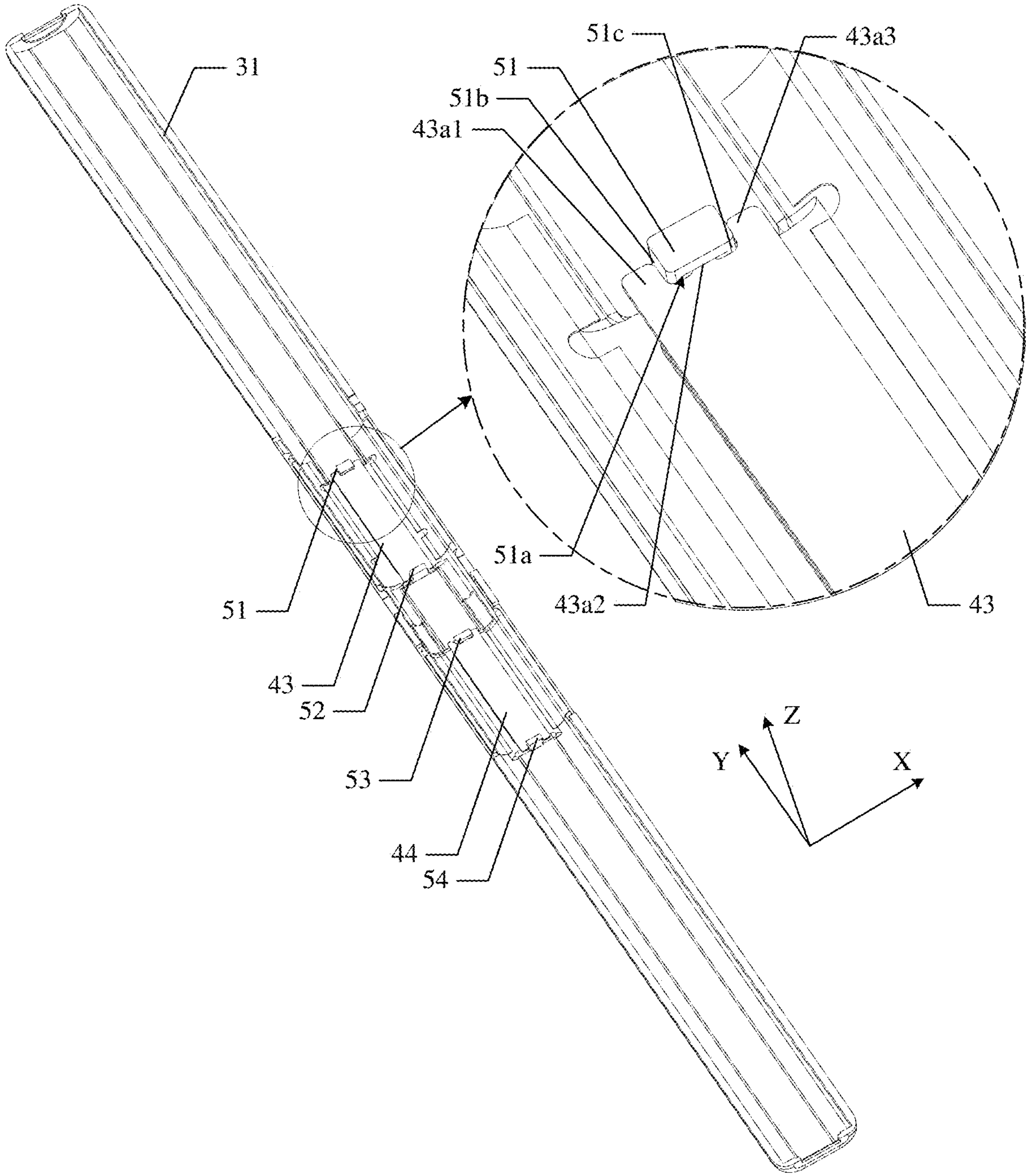
FIG. 10 is a three-dimensional schematic diagram of a shaft cover, a positioning mechanism, and a reinforcing member according to an embodiment of this application from a specific perspective.

Refer to FIG. 10. In an X direction, two ends of a first clamping groove 51*a* are not run-through. In other words, the first clamping groove 51*a* is provided with a first side wall 51*b* and a second side wall 51*c*. The first side wall 51*b* and the second side wall 51*c* are arranged opposite to each other. The first side wall 51*b* and the second side wall 51*c* of the first clamping groove 51*a* may abut against a first protruding portion 43*a*2. When an external force in the X direction is applied to a first reinforcing member 43, the first side wall 51*b* of the first clamping groove 51*a* or the second side wall 51*c* of the first clamping groove 51*a* abuts against the first protruding portion 43*a*2, thereby limiting movement of the first protruding portion 43*a*2 in the X direction.

In an example of this application, a top wall of the first clamping groove 51*a* can limit the movement of the first protruding portion 43*a*2 in a Z direction, and the side wall of the first clamping groove 51*a* can limit the movement of the first protruding portion 43*a*2 in the X direction. It may be learned from the above example that mating of a first notch formed by a first limiting portion 43*a*1 and a second limiting portion 43*a*3 with the first positioning post 51 can limit the movement of the first reinforcing member 43 in the X direction. Therefore, in still some examples of this application, only the first clamping groove 51*a* and the first protruding portion 43*a*2 may be alternatively provided, and the first limiting portion 43*a*1 and the second limiting portion 43*a*3 are not arranged, so as to limit the movement of the first reinforcing member 43 in the X direction and the Y direction.

It should be noted that an end of the first positioning post 51 is fixed to a shaft cover 31, and an other end extends along the Z direction. The first clamping groove 51*a* is directly provided on a surface of the first positioning post 51 opposite to a second positioning post 52. Alternatively, an other end of the first positioning post 51 is provided with a first protrusion protruding toward the second positioning post 52. The first protrusion, the first positioning post 51, and the shaft cover 31 jointly constitute the first clamping groove 51*a*.

Figure 11:
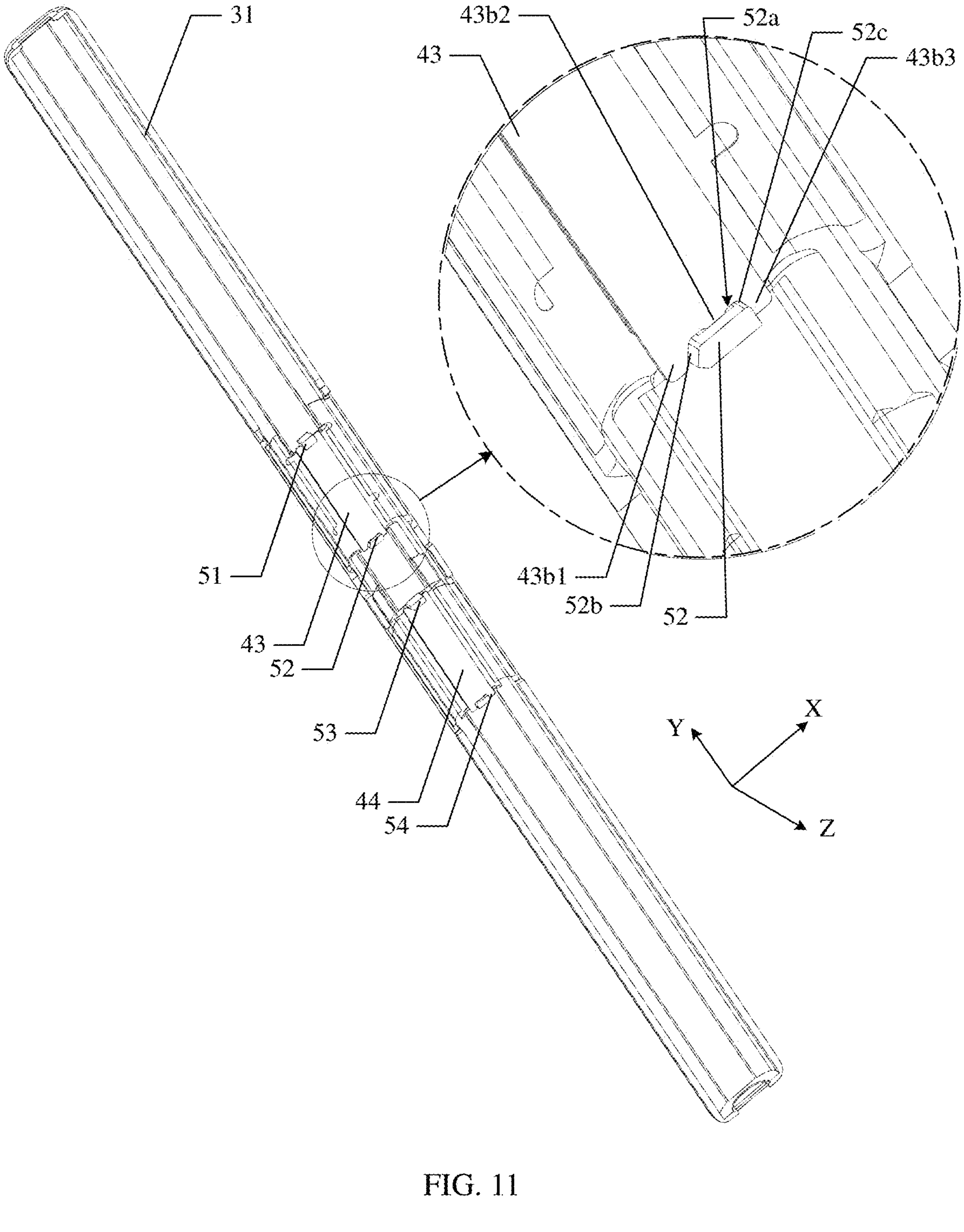
FIG. 11 is a three-dimensional schematic diagram of a shaft cover, a positioning mechanism, and a reinforcing member according to an embodiment of this application from another perspective.

Refer to FIG. 11. In an X direction, two ends of a second clamping groove 52*a* are not run-through. In other words, the second clamping groove 52*a* is provided with a first side wall 52*b* and a second side wall 52*c*. The first side wall 52*b* and the second side wall 52*c* are arranged opposite to each other. The first side wall 52*b* and the second side wall 52*c* of the second clamping groove 52*a* may abut against a second protruding portion 43*b*2. When an external force in the X direction is applied to a first reinforcing member 43, the first side wall 52*b* of the second clamping groove 52*a* or the second side wall 52*c* of the second clamping groove 52*a* abuts against the second protruding portion 43*b*2, thereby limiting movement of the second protruding portion 43*b*2 in the X direction.

In an example of this application, a top wall of the second clamping groove 52*a* can limit the movement of the second protruding portion 43*b*2 in a Z direction, and the side wall of the second clamping groove 52*a* can limit the movement of the second protruding portion 43*b*2 in the X direction. It may be learned from the above example that mating of a second notch formed by a third limiting portion 43*b*1 and a fourth limiting portion 43*b*3 with the second positioning post 52 can limit the movement of the first reinforcing member 43 in the X direction. Therefore, in still some examples of this application, only the second clamping groove 52*a* and the second protruding portion 43*b*2 may be alternatively provided, and the third limiting portion 43*b*1 and the fourth limiting portion 43*b*3 are not arranged, so as to limit the movement of the first reinforcing member 43 in the X direction and the Y direction.

It should be noted that an end of the second positioning post 52 is fixed to a shaft cover 31, and an other end extends along the Z direction. The second clamping groove 52*a* is directly provided on a surface of the second positioning post 52 opposite to a first positioning post 51. Alternatively, an other end of the second positioning post 52 is provided with a second protrusion protruding toward the first positioning post 51. The second protrusion, the second positioning post 52, and the shaft cover 31 jointly constitute the second clamping groove 52*a*.

Figure 12:
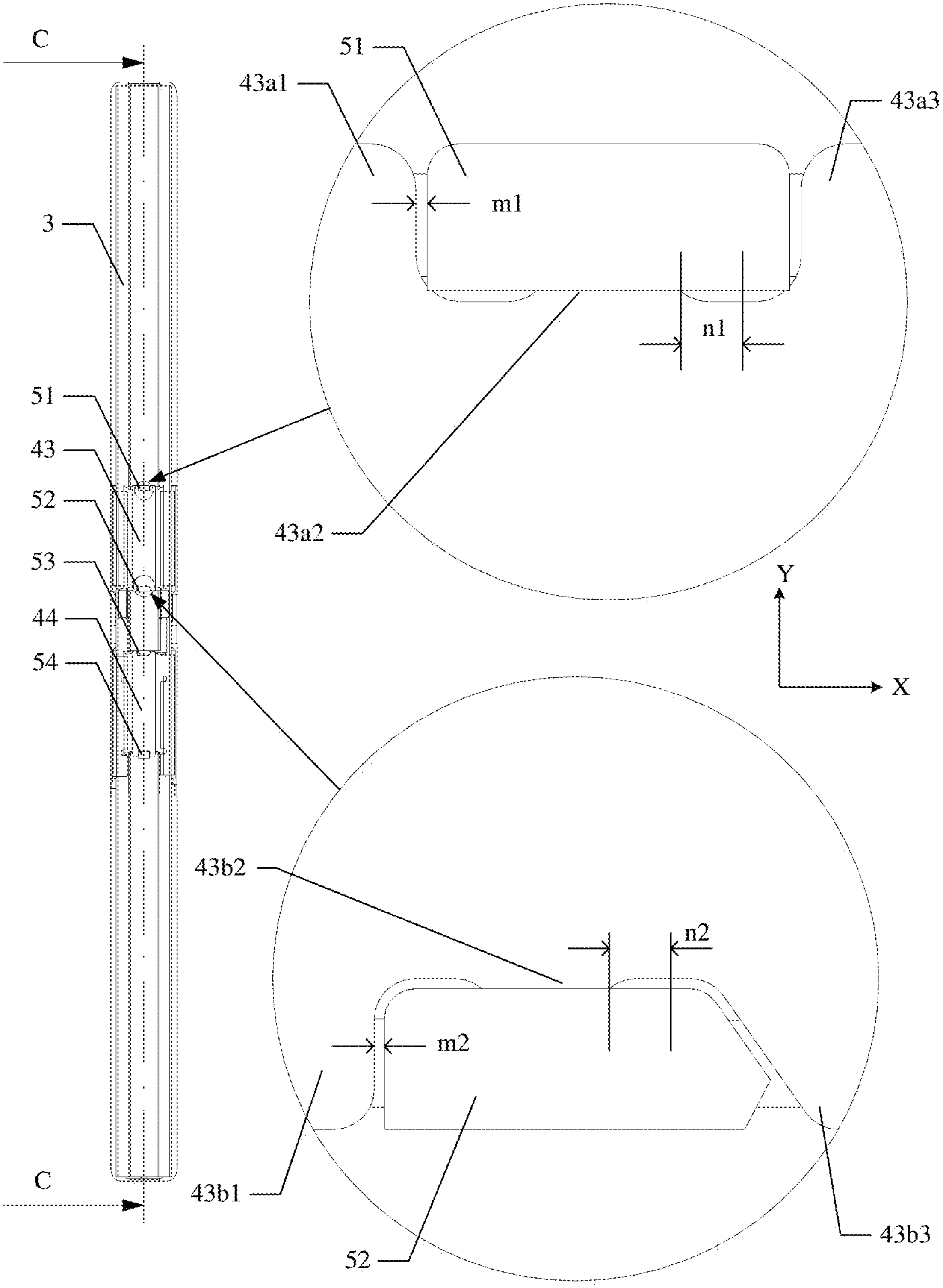
FIG. 12 is schematic front view of a shaft cover, a positioning mechanism, and a reinforcing member according to an embodiment of this application.

With reference to FIG. 10 and FIG. 11, referring to FIG. 12, in some examples of this application, a first end 43*a* of a first reinforcing member 43 is mated with a first positioning post 51 through a first notch, thereby realizing positioning of the first end of the first reinforcing member 43 in an X direction and a Y direction. A first positioning gap ml is defined between the first notch and the first positioning post 51, so that the first notch can be smoothly mounted to the first positioning post 51, to ensure positioning precision of the first notch and the first positioning post. A second end 43*b* of a second reinforcing member 44 is mated with a second positioning post 52 through a second notch, thereby realizing positioning of the second end 43*b* of the first reinforcing member 43 in the X direction and the Y direction. A second positioning gap m2 is defined between the second notch and the second positioning post 52, so that the second notch can be smoothly mounted to the second positioning post 52, to ensure positioning precision of the second notch and the second positioning post.

It should be noted that the first positioning gap m1 is a vertical distance between an inner surface of the first notch and a part corresponding to an outer surface of the first positioning post 51. In the figure, if a section of the first positioning post 51 and the first notch are both shaped like a rectangle, the first positioning gap m1 is a vertical distance between corresponding sides of the two rectangles. The second positioning gap m2 is a vertical distance between an inner surface of the second notch and a part corresponding to an outer surface of the second positioning post 52. In the figure, if a section of the second positioning post 52 and the second notch are both shaped like a right-angled trapezoid, the second positioning gap m2 is a vertical distance between corresponding sides of the two right-angled trapezoids.

To improve precision of the first reinforcing member 43 during mounting, the first positioning gap m1 and the second positioning gap m2 ranges from 0.03 mm to 0.1 mm, and are preferably 0.05 mm. In other words, positioning precision of the first notch of the first reinforcing member 43 and the first positioning post 51 is ensured, and positioning precision of the second notch of the first reinforcing member 43 and the second positioning post 52 is ensured. When the first reinforcing member 43 is mounted in place between the first positioning post 51 and the second positioning post 52, a margin for movement exists between the first notch and the first positioning post 51, and a margin for movement exists between the second notch and the second positioning post 52, thereby ensuring that a margin for movement exists between the first reinforcing member 43 in the X direction and the Y direction. When an external force in the X direction and/or the Y direction is applied to the first reinforcing member 43, a specific buffer space exists, which reduces strength of rigid pulling.

Further, in the X direction, a first avoidance gap n1 is defined between the first clamping groove 51*a* and the first protruding portion 43*a*2. By providing the first avoidance gap n1, the first notch can be arranged on the first positioning post 51. Similarly, a second avoidance gap n2 is defined between the second clamping groove 52*a* and the second protruding portion 43*b*2. By providing the second avoidance gap n2, the second notch can be arranged on the second positioning post 52. It should be noted that the foregoing first avoidance gap n1 is a distance between the first protruding portion 43*a*2 and each of the first side wall 51*b* and the second side wall 51*c* of the first clamping groove 51*a* in the X direction. The foregoing second avoidance gap n2 is a distance between the second protruding portion 43*b*2 and each of the first side wall 52*b* and the second side wall 52*c* of the second clamping groove 52*a* in the X direction.

The foregoing first avoidance gap n1 is greater than the first positioning gap m1, and/or the second avoidance gap n2 is greater than the second positioning gap m1, thereby preventing the FPC from being skewed and implementing reliable positioning and fixation in the X direction and the Y direction.

Figure 13:
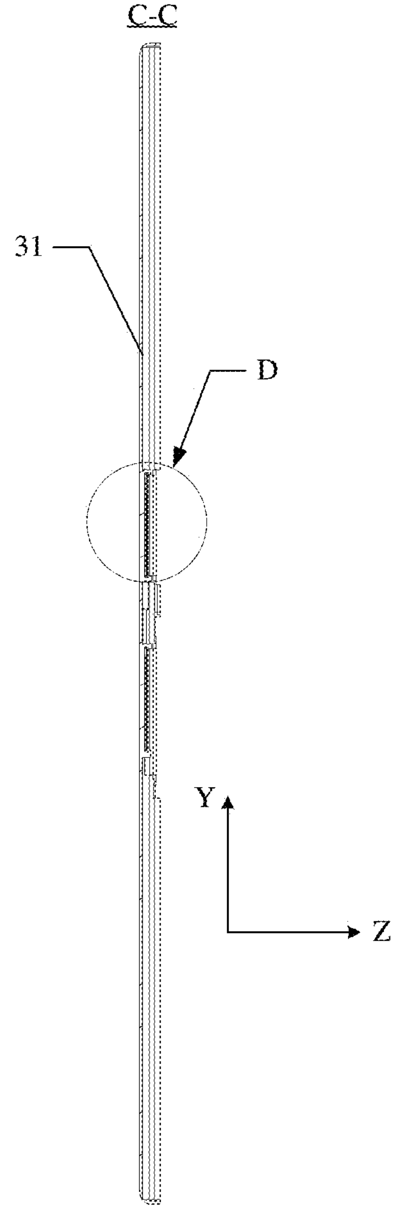
FIG. 13 is a schematic diagram of a section in FIG. 12 taken along C-C.
Figure 14A:
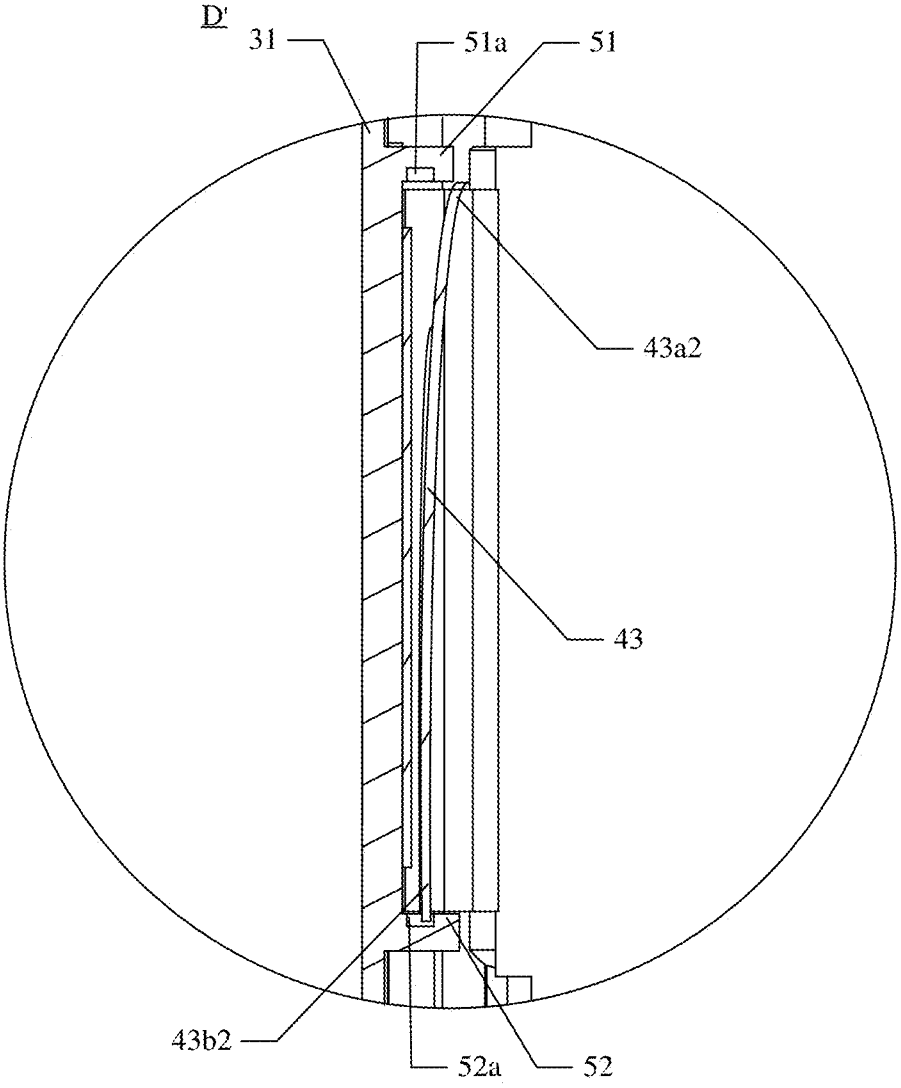
FIG. 14A is an enlarged schematic view of a part D in FIG. 13 during mounting.
Figure 14B:
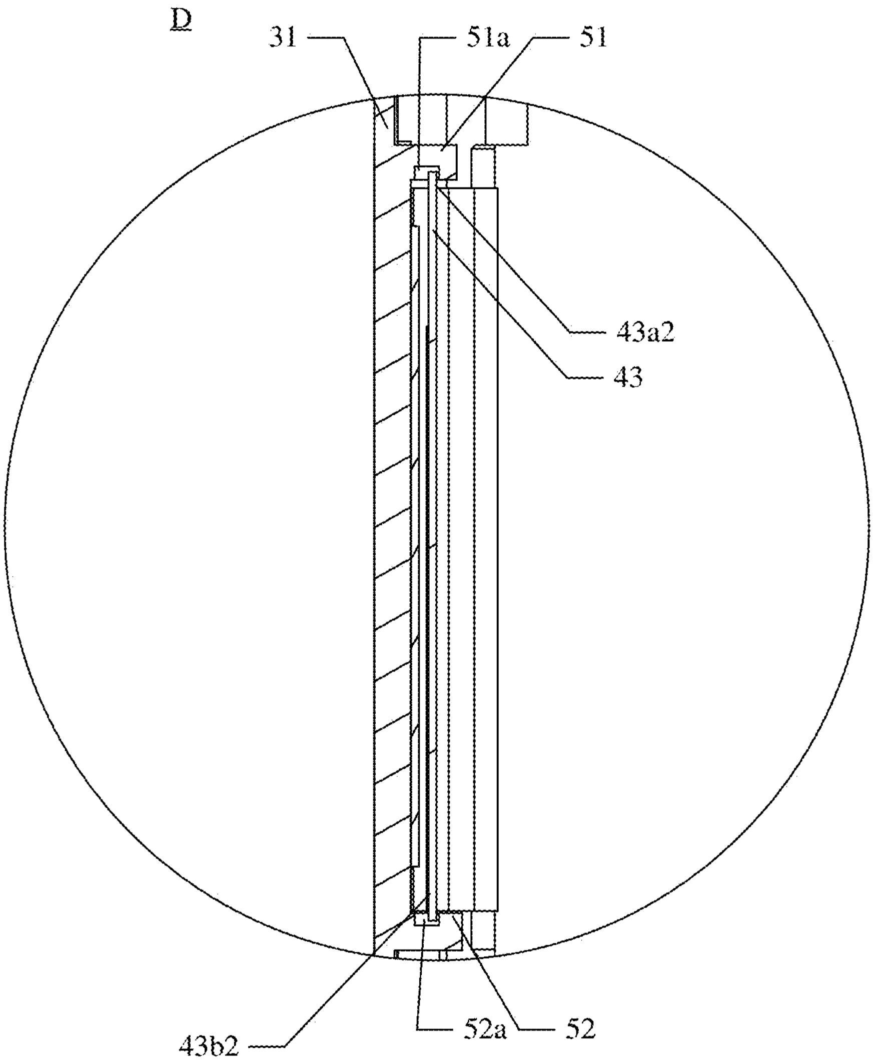
FIG. 14B is an enlarged schematic view of a part D in FIG. 13.

Refer to FIG. 13, FIG. 14A, and FIG. 14B. A first protruding portion 43*a*2 on a first reinforcing member 43 interferes with a first positioning post 51, and a second protruding portion 43*b*2 interferes with a second positioning post 52 in a Y direction. Therefore, the second protruding portion 43*b*2 needs to be obliquely inserted into a first clamping groove 51*a* during assembly. The first reinforcing member 43 is used as an elastic arm for the first protruding portion 43*a*2 for an entire length for which reinforcement is applied, to reduce the length of the first reinforcing member 43 in a Y direction after the first reinforcing member is elastically deformed, as shown in FIG. 14A. In this way, the first reinforcing member 43 can be assembled between the first positioning post 51 and the second positioning post 52, and after the assembling, the first reinforcing member 43 is released to recover from elastic deformation and be assembled in place, as shown in FIG. 14B. The first reinforcing member 43 is made of a highly elastic SUS-301EH material, which may effectively form an elastic arm. The first reinforcing member 43 may be further made of metal, a polymer material, an inorganic non-metallic material, or the like other than the SUS-301EH material. When the first reinforcing member is a metal plate, the metal plate may be a stainless steel reinforcing plate or an aluminum foil reinforcing plate. When the first reinforcing member is a polymer plate, the polymer plate may be a polyester reinforcing plate, a polyimide reinforcing plate, a glass fiber reinforcing plate, a polytetrafluoroethylene reinforcing plate, a polycarbonate reinforcing plate, or the like. This is not strictly limited in the examples of this application.

It should be noted that in the foregoing assembly process, the second protruding portion 43*b*2 is first inserted into the second clamping groove 52*a* obliquely. In still some examples of this application, the first protruding portion 43*a*2 may be further first inserted into the first clamping groove 51*a* obliquely.

Based on the above, the first protruding portion 43*a*2 is mated with the first positioning post 51 through the first clamping groove 51*a*, and the second protruding portion 43*b*2 is mated with the second positioning post 52 through the second clamping groove 52*a*. In some other examples of this application, a first bump protruding toward the first reinforcing member 43 may be further arranged on a surface of the first protruding portion 43*a*2 opposite to the second protruding portion 43*b*2, to limit movement of the first protruding portion 43*a*2 in a Z direction. A second bump protruding toward the first reinforcing member 43 is arranged on a surface of the second protruding portion 43*b*2 opposite to the first protruding portion 43*a*2, to limit movement of the second protruding portion 43*b*2 in the Z direction. Further, for ease of mounting, a surface on which the first bump first contacts the first protruding portion 43*a*2 is an inclined surface, or a surface on which the second bump first contacts the second protruding portion 43*b*2 is an inclined surface.

The first positioning post 51 and the second positioning post 52 are arranged to protrude from an end surface of a shaft cover 31. In still some examples of this application, a mounting groove may be further arranged on the end surface of the shaft cover 31. clamping grooves or bumps may be provided on opposite groove walls of the mounting groove in a Y direction, to realize a snap fit with two ends of the first reinforcing member 43. The positioning post and the groove wall of the mounting groove may be understood as positioning members, and the clamping groove or the bump may be understood as an clamping structure.

The first reinforcing member 43 has two functions. A first function is to limit movement of a first FPC 41 in the Z direction, and a second function is to mechanically reinforce a local structure of the first FPC 41. However, in the example of this application, the first reinforcing member 43 mainly exists as a limiting member for limiting the movement of the first FPC 41 in the Z direction. It should be noted that the limiting member may be used as partial structure of the first FPC 41, or may exist independently of the first FPC 41. In other words, the limiting member does not belong to the structure of the first FPC 41.

Some examples of this application further disclose an FPC assembly. The assembly includes a positioning mechanism of the foregoing structure, and further includes a base and an FPC. The FPC is arranged on the base through the positioning mechanism. When the FPC is mounted in place through the positioning mechanism, movement of the FPC in an X direction, a Y direction, and a Z direction may be limited. The assembly of the FPC assembly is simplified, and the structure of the FPC assembly is optimized.

Figure 15:
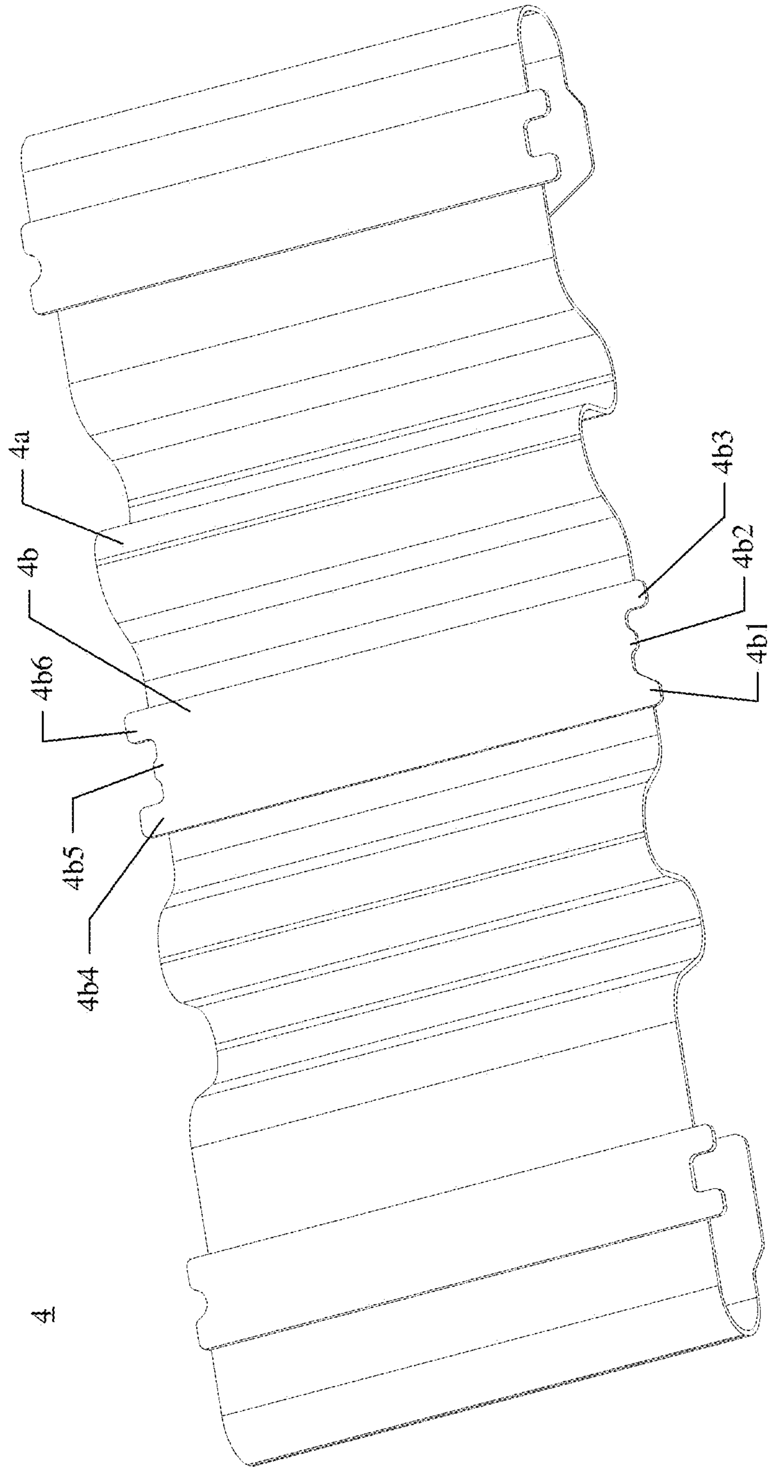
FIG. 15 is a three-dimensional view of an FPC according to an embodiment of this application.
Figure 16:
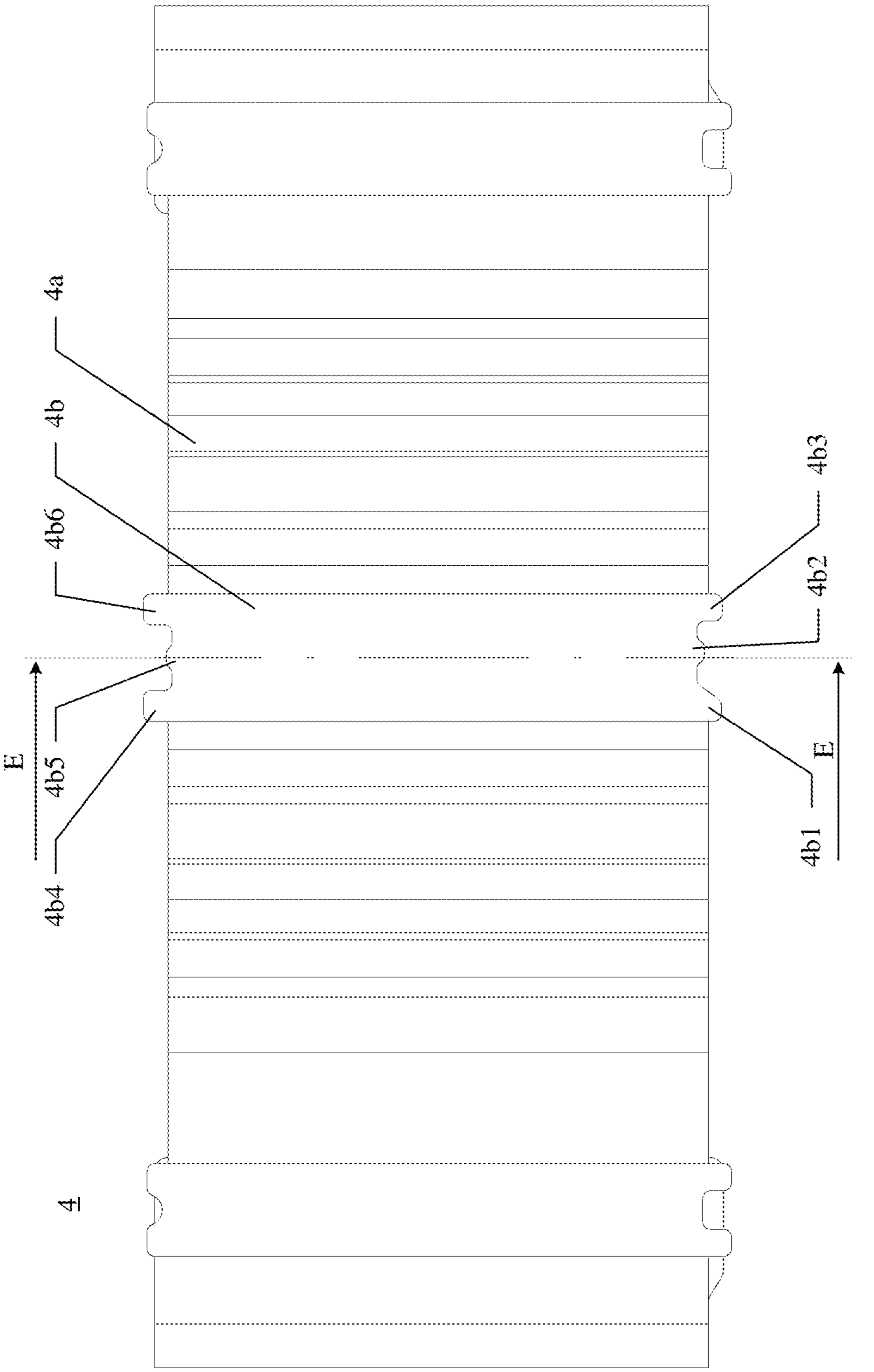
FIG. 16 is a front view of an FPC according to an embodiment of this application.
Figure 17:
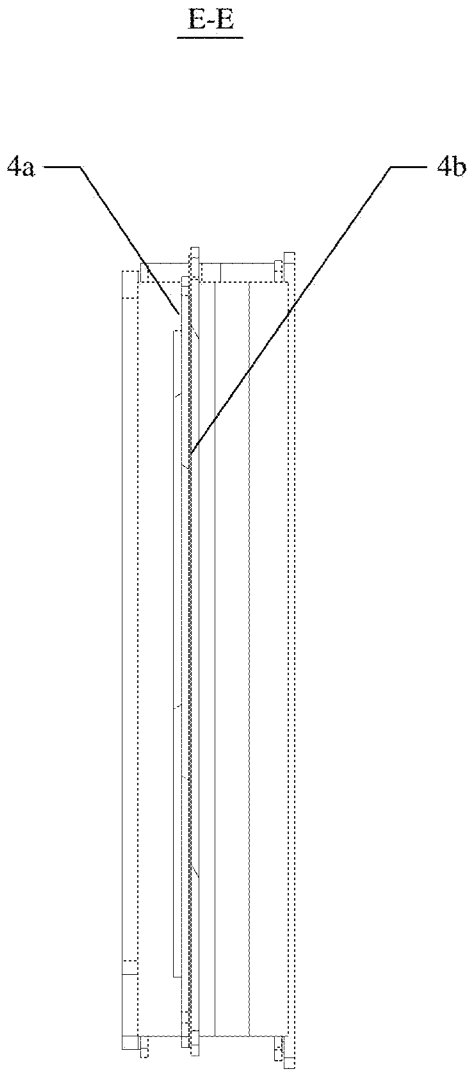
FIG. 17 is a schematic diagram of a section in FIG. 16 taken along E-E.

Refer to FIG. 15 to FIG. 17. Some examples of this application further disclose an FPC 4, including a circuit board body 4*a*, and further including a reinforcing member 4*b* arranged on a surface of the circuit board body 4*a*. A first limiting portion 4*b*1, a first protruding portion 4*b*2, and a second limiting portion 4*b*3 are arranged in sequence on a first end of the reinforcing member 4*b*. The first limiting portion 4*b*1 and the second limiting portion 4*b*3 form a first notch. The first protruding portion 4*b*2 is located in a first notch, and protrudes outward relative to a notch wall of the first notch. A fourth limiting portion 4*b*4, a second protruding portion 4*b*5, and a fifth limiting portion 4*b*6 are arranged in sequence on a second end of the reinforcing member 4*b*. The fourth limiting portion 4*b*4 and the fifth limiting portion 4*b*6 form a second notch. The second protruding portion 43*b*2 is located in the second notch, and protrudes outward relative to a notch wall of the second notch. Since the foregoing FPC 4 of this application has the above structure, the FPC can be directly snap-fitted between the limiting members of the above positioning mechanism by means of the reinforcing member thereof. The FPC 4 can be fixed without an additional structure, thereby simplifying the mounting of the FPC 4 and reducing the space occupied when the FPC 4 is fixed.

The circuit board body 4*a* includes at least one substrate layer and at least one wiring layer. The substrate layer includes a polyimide film and/or a polyester film. At least one wiring layer forms a circuit of the FPC 4, and transmission of signals and energy can be implemented through the at least one wiring layer.

The above examples are only the description of the technical solution in which the positioning mechanism is arranged on the shaft cover. It should be noted that the foregoing positioning mechanism may be further arranged on the rotating shaft, on the middle frame, or the like. A specific structure thereof is similar to the technical solution in which the positioning mechanism is arranged on the shaft cover. In this application, the structure such as the shaft cover, the rotating shaft, or the middle frame that needs to be provided with the positioning mechanism may be understood as a base. The base has a function of fixing the FPC while having respective functions.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A positioning mechanism, configured to be arranged on a base, wherein the positioning mechanism comprises:

at least two positioning members, arranged at intervals on the base along a length direction of the base; and a limiting member, arranged between the two positioning members, wherein each of the positioning members is provided with an clamping structure, two ends of the limiting member respectively extend to the clamping structures corresponding to the two positioning members, the clamping structure is configured to limit movement of the limiting member in a thickness direction of the base, and a flexible printed circuit is arranged between the limiting member and the base;

the positioning member comprises a positioning post, an end of the positioning post is fixed to the base, and an other end of the positioning post is provided with a protrusion extending toward the limiting member; and the protrusion, the positioning post, and the base constitute the clamping groove.

2. The positioning mechanism according to claim 1, wherein the clamping structure comprises an clamping groove, and two ends of the limiting member respectively extend into the clamping grooves corresponding to the two positioning members.

3. The positioning mechanism according to claim 2, wherein the clamping groove is provided with opposite side walls along a width direction of the base.

4. The positioning mechanism according to claim 3, wherein two end portions of the limiting member along the length direction of the base are each provided with a notch, and the positioning member corresponding to each notch is at least partially located in the notch.

5. The positioning mechanism according to claim 4, wherein the end portion of the limiting member extending to the positioning member comprises two limiting portions arranged at intervals, and the notch is formed in a region between the two limiting portions; and the notch is provided with a protruding portion protruding toward the clamping groove.

6. The positioning mechanism according to claim 5, wherein a positioning gap is defined between the notch and a part of the positioning members located in the notch.

7. The positioning mechanism according to claim 6, wherein the positioning gap ranges from 0.03 mm to 0.1 mm.

8. The positioning mechanism according to claim 6, wherein an avoidance gap is defined between the protruding portion and the clamping groove in the width direction of the base.

9. The positioning mechanism according to claim 8, wherein the avoidance gap is larger than the positioning gap.

10. The positioning mechanism according to claim 4, wherein the notches at the two ends of the limiting member have different shapes, and a contour of the positioning member located in each of the notches matches a contour of the notch.

11. The positioning mechanism according to claim 10, wherein one of the two notches is a rectangular structure, and the other is a trapezoidal structure.

12. The positioning mechanism according to claim 1, further comprising a back adhesive arranged between the base and the flexible printed circuit.

13. The positioning mechanism according to claim 1, further comprising protective members arranged on two sides of the base in the width direction.

14. The positioning mechanism according to claim 13, wherein the protective member comprises Teflon mylar.

15. The positioning mechanism according to claim 1, wherein the limiting member comprises a reinforcing member, and the reinforcing member is arranged on a circuit board body of the flexible printed circuit.

16. The positioning mechanism according to claim 15, wherein the reinforcing member comprises a steel reinforcing sheet.

17. A flexible printed circuit assembly, comprising the positioning mechanism according to claim 1, and further comprising a base and a flexible printed circuit, wherein the flexible printed circuit is arranged on the base through the positioning mechanism.

18. A flexible printed circuit, comprising a circuit board body, and further comprising at least one reinforcing member according to claim 15, wherein the reinforcing member is arranged on a surface of the circuit board body.

19. The flexible printed circuit assembly according to claim 17, further comprising a base and a flexible printed circuit, wherein the flexible printed circuit is arranged on the base through the positioning mechanism.

20. The flexible printed circuit assembly according to claim 17, further comprising a base and a flexible printed circuit, wherein the flexible printed circuit is arranged on the base through the positioning mechanism.

* * * * *